United States Patent
Pagel et al.

(10) Patent No.: US 7,715,546 B2
(45) Date of Patent: May 11, 2010

(54) SYSTEM AND METHOD FOR UPDATING CONTACT RECORDS

(75) Inventors: Ezra U. Pagel, Austin, TX (US); Daniel N. Duncan, Austin, TX (US); Thomas Miller, Westfield, NJ (US)

(73) Assignee: Austin Logistics Incorporated, Austin, TX (US)

( * ) Notice: Subject to any disclaimer, the term of this patent is extended or adjusted under 35 U.S.C. 154(b) by 1858 days.

(21) Appl. No.: 10/776,775

(22) Filed: Feb. 9, 2004

(65) Prior Publication Data

US 2004/0179672 A1     Sep. 16, 2004

Related U.S. Application Data

(63) Continuation-in-part of application No. 10/456,575, filed on Jun. 6, 2003, now Pat. No. 7,054,434, which is a continuation-in-part of application No. 10/095,513, filed on Mar. 12, 2002, now Pat. No. 7,103,173, which is a continuation-in-part of application No. 09/901,749, filed on Jul. 9, 2001, now Pat. No. 7,142,662.

(51) Int. Cl.
    *H04M 3/00* (2006.01)
(52) U.S. Cl. .................. 379/265.02; 379/266
(58) Field of Classification Search .......... 379/265, 379/266, 309, 207, 208, 216
    See application file for complete search history.

(56) References Cited

U.S. PATENT DOCUMENTS

| | | | |
|---|---|---|---|
| 4,881,261 A | 11/1989 | Oliphant et al. | 379/215 |
| 5,040,208 A | 8/1991 | Jolissaint | 379/201 |
| 5,185,782 A | 2/1993 | Srinivasan | 379/67 |
| 5,335,269 A | 8/1994 | Steinlicht | 379/266 |
| 5,440,585 A | 8/1995 | Partridge, III | 375/261 |
| 5,444,774 A | 8/1995 | Friedes | 379/266 |
| 5,448,555 A | 9/1995 | Bremer et al. | 270/20 |
| 5,479,487 A | 12/1995 | Hammond | 379/67 |
| 5,499,289 A | 3/1996 | Bruno et al. | 379/220 |
| 5,499,291 A | 3/1996 | Kepley | 379/265 |

(Continued)

OTHER PUBLICATIONS

Lucent's CentreVu® Advocate[SM] white paper; Lucent's CentreVu Advocate, Breakthrough Solutions for Your Success; Lucent Technologies 1999.

(Continued)

*Primary Examiner*—Curtis Kuntz
*Assistant Examiner*—Amal Zenati
(74) *Attorney, Agent, or Firm*—Hamilton & Terrile, LLP; Robert W. Holland

(57) ABSTRACT

A system and method for updating contact records automates analysis of contact results for one or more contact devices performing a contact campaign in order to select contact records for skip trace updates to contact information with the updated contact information for real time use by the contact devices. For instance, an update engine analyzes contact records returned by dialers to a distribution module to select contact records to skip trace based on rules, such as where a wrong number code is indicated, or cost analysis, such as where the predicted result of an update has a value greater than the cost of obtaining the update. The distribution model provides the updated contact information for real time use by the dialers of the updated contact numbers.

23 Claims, 9 Drawing Sheets

U.S. PATENT DOCUMENTS

| | | | |
|---|---|---|---|
| 5,509,055 A | 4/1996 | Ehrlich et al. | 379/133 |
| 5,533,108 A | 7/1996 | Harris et al. | 379/201 |
| 5,537,436 A | 7/1996 | Bottoms et al. | 375/222 |
| 5,574,781 A | 11/1996 | Blaze | 379/220 |
| 5,627,884 A | 5/1997 | Williams et al. | 379/88 |
| 5,661,718 A | 8/1997 | Bremer et al. | 370/207 |
| 5,717,747 A | 2/1998 | Boyle, III et al. | 379/201 |
| 5,721,770 A | 2/1998 | Kohler | 379/266 |
| 5,732,218 A | 3/1998 | Bland et al. | 395/200.54 |
| 5,740,238 A | 4/1998 | Flockhart et al. | 379/221 |
| 5,742,674 A | 4/1998 | Jain et al. | 379/209 |
| 5,751,795 A | 5/1998 | Hassler et al. | 379/93.17 |
| 5,754,639 A | 5/1998 | Flockhart et al. | 379/221 |
| 5,757,644 A | 5/1998 | Jorgensen et al. | 364/188 |
| 5,757,904 A | 5/1998 | Anderson | 379/265 |
| 5,802,161 A * | 9/1998 | Svoronos et al. | 379/216.01 |
| 5,825,870 A | 10/1998 | Miloslavsky | 379/265 |
| 5,828,747 A | 10/1998 | Fisher et al. | 379/309 |
| 5,838,682 A | 11/1998 | Dekelbaum et al. | 370/401 |
| 5,848,143 A | 12/1998 | Andrews et al. | 379/219 |
| 5,867,559 A | 2/1999 | Jorgensen et al. | 379/67 |
| 5,878,130 A | 3/1999 | Andrews et al. | 379/265 |
| 5,889,799 A * | 3/1999 | Grossman et al. | 379/266.08 |
| 5,898,772 A | 4/1999 | Connors et al. | 379/265 |
| 5,903,641 A | 5/1999 | Tonisson | 379/266 |
| 5,903,877 A | 5/1999 | Berkowitz et al. | 705/26 |
| 5,905,793 A | 5/1999 | Flockhart et al. | 379/266 |
| 5,915,003 A | 6/1999 | Bremer et al. | 379/93.19 |
| 5,926,539 A | 7/1999 | Shtivelman | 379/266 |
| 5,930,337 A | 7/1999 | Mohler | 379/88.22 |
| 5,933,476 A | 8/1999 | Hansen et al. | 379/52 |
| 5,940,475 A | 8/1999 | Hansen | 379/52 |
| 5,943,395 A | 8/1999 | Hansen | 379/52 |
| 5,946,386 A | 8/1999 | Rogers et al. | 379/265 |
| 5,960,382 A | 9/1999 | Steiner | 704/2 |
| 5,982,873 A | 11/1999 | Flockhart et al. | 379/266 |
| 5,987,115 A | 11/1999 | Petrunka et al. | 379/265 |
| 5,991,293 A | 11/1999 | Buchanan et al. | 370/353 |
| 6,002,749 A | 12/1999 | Hansen et al. | 379/52 |
| 6,002,760 A | 12/1999 | Gisby | 379/266 |
| 6,009,162 A | 12/1999 | Bogart et al. | 379/265 |
| 6,014,439 A | 1/2000 | Walker et al. | 379/266 |
| 6,038,302 A | 3/2000 | Burok et al. | 379/201 |
| 6,052,460 A | 4/2000 | Fisher et al. | 379/266 |
| 6,061,442 A | 5/2000 | Bhat | 379/269 |
| 6,064,730 A | 5/2000 | Ginsberg | 379/265 |
| 6,064,731 A | 5/2000 | Flockhart et al. | 379/265 |
| 6,070,012 A | 5/2000 | Eitner et al. | 395/712 |
| 6,078,650 A | 6/2000 | Hansen | 379/52 |
| 6,088,441 A | 7/2000 | Flockhart et al. | 379/265 |
| 6,088,442 A | 7/2000 | Chavez, Jr. et al. | 379/265 |
| 6,088,444 A | 7/2000 | Walker et al. | 379/266 |
| 6,091,808 A | 7/2000 | Wood et al. | 379/201 |
| 6,118,861 A | 9/2000 | Gutzmann et al. | 379/201 |
| 6,122,364 A | 9/2000 | Petrunka et al. | 379/265 |
| 6,154,530 A | 11/2000 | Letellier | 379/142 |
| 6,163,606 A | 12/2000 | Otto | 379/211 |
| 6,163,607 A | 12/2000 | Bogart et al. | 379/266 |
| 6,173,053 B1 | 1/2001 | Bogart et al. | 379/266 |
| 6,181,776 B1 | 1/2001 | Crossley et al. | 379/34 |
| 6,188,673 B1 | 2/2001 | Bauer et al. | 370/252 |
| 6,188,762 B1 | 2/2001 | Shooster | 379/265 |
| 6,192,050 B1 | 2/2001 | Stovall | 370/389 |
| 6,192,122 B1 | 2/2001 | Flockhart et al. | 379/266 |
| 6,205,204 B1* | 3/2001 | Morganstein et al. | 379/67.1 |
| 6,205,412 B1 | 3/2001 | Barkiy et al. | 703/13 |
| 6,208,721 B1 | 3/2001 | Feinberg et al. | 379/134 |
| 6,215,784 B1 | 4/2001 | Petras et al. | 370/356 |
| 6,226,377 B1 | 5/2001 | Donoaghue, Jr. | 379/265 |
| 6,233,332 B1 | 5/2001 | Anderson et al. | 379/265 |
| 6,240,391 B1 | 5/2001 | Ball et al. | 704/270 |
| 6,256,299 B1 | 7/2001 | Chavez, Jr. et al. | 370/329 |
| 6,256,381 B1 | 7/2001 | Donoaghue, Jr. | 379/265 |
| 6,272,216 B1 | 8/2001 | Vaios | 379/265 |
| 6,272,544 B1 | 8/2001 | Mullen | 709/226 |
| 6,292,550 B1 | 9/2001 | Burritt | 379/201 |
| 6,295,353 B1 | 9/2001 | Flockhart et al. | 379/265 |
| 6,298,127 B1 | 10/2001 | Petrunka | 379/126 |
| 6,301,354 B1 | 10/2001 | Walker et al. | 379/266.01 |
| 6,314,177 B1 | 11/2001 | Davis et al. | 379/265.12 |
| 6,327,362 B1 | 12/2001 | Hull et al. | 379/265 |
| 6,337,858 B1 | 1/2002 | Petty et al. | 370/356 |
| 6,349,205 B1 | 2/2002 | Fang et al. | 455/419 |
| 6,353,667 B1 | 3/2002 | Foster et al. | 379/265.05 |
| 6,353,851 B1 | 3/2002 | Anupam et al. | 709/204 |
| 6,356,632 B1 | 3/2002 | Foster et al. | 379/265.04 |
| 6,359,982 B1 | 3/2002 | Foster et al. | 379/266.06 |
| 6,366,666 B2 | 4/2002 | Bengtson et al. | 379/265.05 |
| 6,366,668 B1 | 4/2002 | Borst et al. | 379/266.04 |
| 6,377,944 B1 | 4/2002 | Busey et al. | 703/3 |
| 6,385,191 B1 | 5/2002 | Coffman et al. | 370/352 |
| 6,385,302 B1 | 5/2002 | Antonucci et al. | 379/45 |
| 6,385,646 B1 | 5/2002 | Brown et al. | 709/217 |
| 6,389,132 B1 | 5/2002 | Price | 379/265.01 |
| 6,392,666 B1 | 5/2002 | Hong et al. | 345/736 |
| 6,404,747 B1 | 6/2002 | Berry et al. | 370/270 |
| 6,408,066 B1 | 6/2002 | Andruska et al. | 379/265.15 |
| 6,430,174 B1 | 8/2002 | Jennings et al. | 370/352 |
| 6,434,230 B1 | 8/2002 | Gabriel | 379/265.01 |
| 6,445,788 B1 | 9/2002 | Torba | 379/266.08 |
| 6,449,341 B1 | 9/2002 | Adams et al. | 379/9 |
| 6,449,618 B1 | 9/2002 | Blott et al. | 707/101 |
| 6,459,774 B1 | 10/2002 | Ball et al. | 379/67.1 |
| 6,459,788 B1 | 10/2002 | Khuc et al. | 379/265.09 |
| 6,463,346 B1 | 10/2002 | Flockhart et al. | 700/102 |
| 6,470,077 B1 | 10/2002 | Chan | 379/88.01 |
| 6,473,404 B1 | 10/2002 | Kaplan et al. | 370/238 |
| 6,473,505 B1 | 10/2002 | Khuc et al. | 379/265.01 |
| 6,477,559 B1 | 11/2002 | Veluvali et al. | 709/101 |
| 6,480,484 B2 | 11/2002 | Morton | 370/352 |
| 6,480,601 B1 | 11/2002 | McLaughlin | 379/265.11 |
| 6,480,698 B2 | 11/2002 | Ho et al. | 434/362 |
| 6,493,447 B1 | 12/2002 | Goss et al. | 379/265.09 |
| 6,496,831 B1 | 12/2002 | Baulier et al. | 707/101 |
| 6,498,921 B1 | 12/2002 | Ho et al. | 434/362 |
| 6,499,023 B1 | 12/2002 | Dong et al. | 706/46 |
| 6,501,937 B1 | 12/2002 | Ho et al. | 434/362 |
| 6,502,133 B1 | 12/2002 | Baulier et al. | 709/224 |
| 6,505,183 B1 | 1/2003 | Loofbourrow et al. | 706/45 |
| 6,512,415 B1 | 1/2003 | Katz | 329/88.22 |
| 6,526,397 B2 | 2/2003 | Chee et al. | 701/1 |
| 6,535,601 B1 | 3/2003 | Flockhart et al. | 379/266.01 |
| 6,539,090 B1 | 3/2003 | Frey et al. | 379/230 |
| 6,539,538 B1 | 3/2003 | Brewster et al. | 717/115 |
| 6,542,156 B1 | 4/2003 | Hong et al. | 345/440 |
| 6,549,769 B1 | 4/2003 | Harder | 455/418 |
| 6,560,330 B2 | 5/2003 | Gabriel | 379/265.02 |
| 6,560,649 B1 | 5/2003 | Mullen et al. | 709/226 |
| 6,563,788 B1 | 5/2003 | Torba et al. | 370/229 |
| 6,563,916 B1 | 5/2003 | Deutsch et al. | 379/215.01 |
| 6,563,920 B1 | 5/2003 | Flockhart et al. | 379/265.01 |
| 6,567,787 B1 | 5/2003 | Walker et al. | 705/16 |
| 6,570,975 B2 | 5/2003 | Shaffer et al. | 379/220.01 |
| 6,570,976 B2 | 5/2003 | Asada et al. | |
| 6,571,240 B1 | 5/2003 | Ho et al. | 707/5 |
| 6,574,605 B1 | 6/2003 | Sanders et al. | 705/8 |
| 6,577,720 B1 | 6/2003 | Sutter | 379/144.05 |
| 6,581,105 B2 | 6/2003 | Miloslavsky et al. | 709/238 |
| 6,581,205 B1 | 6/2003 | Cochrane et al. | 717/140 |
| 6,584,439 B1 | 6/2003 | Geilhufe et al. | 704/270 |
| 6,587,545 B1 | 7/2003 | Antonucci et al. | 379/37 |
| 6,587,557 B1 | 7/2003 | Smith | 379/265.01 |
| 6,594,470 B1 | 7/2003 | Barnes et al. | 455/67.7 |
| 6,778,643 B1* | 8/2004 | Bushey et al. | 379/88.18 |

| | | | |
|---|---|---|---|
| 7,023,980 B2 * | 4/2006 | Lenard | 379/266.07 |
| 2001/0000458 A1 | 4/2001 | Shtivelman et al. | 370/412 |
| 2001/0021646 A1 | 9/2001 | Antonucci et al. | 455/404 |
| 2001/0038624 A1 | 11/2001 | Greenberg et al. | 370/352 |
| 2001/0040887 A1 | 11/2001 | Shtivelman et al. | 370/352 |
| 2002/0010645 A1 | 1/2002 | Hagen et al. | 705/26 |
| 2002/0073155 A1 | 6/2002 | Anupam et al. | 709/205 |
| 2002/0101854 A1 | 8/2002 | Siegrist et al. | 370/352 |
| 2002/0101866 A1 | 8/2002 | Miloslavsky et al. | 370/386 |
| 2002/0131399 A1 | 9/2002 | Philonenko | 370/351 |
| 2002/0141561 A1 | 10/2002 | Duncan et al. | 379/220.01 |
| 2002/0169834 A1 | 11/2002 | Miloslavsky et al. | 709/206 |
| 2002/0183072 A1 | 12/2002 | Steinbach et al. | 455/456 |
| 2002/0194047 A1 | 12/2002 | Edinger et al. | 705/9 |
| 2002/0194272 A1 | 12/2002 | Zhu | 709/204 |
| 2002/0196277 A1 | 12/2002 | Bushey et al. | 345/745 |
| 2003/0001625 A1 | 1/2003 | Jaussi et al. | 327/65 |
| 2003/0002654 A1 | 1/2003 | Torba | 379/266.08 |
| 2003/0007612 A1 | 1/2003 | Garcia | 379/88.18 |
| 2003/0007625 A1 | 1/2003 | Pines et al. | 379/223 |
| 2003/0013438 A1 | 1/2003 | Darby | 455/419 |
| 2003/0021259 A1 | 1/2003 | Miloslavsky et al. | 370/352 |
| 2003/0026409 A1 | 2/2003 | Bushey et al. | 379/211.02 |
| 2003/0033382 A1 | 2/2003 | Bogolea et al. | 709/218 |
| 2003/0088660 A1 | 5/2003 | Florman et al. | 709/223 |
| 2003/0099342 A1 | 5/2003 | Tiliks et al. | 379/216.01 |
| 2003/0115353 A1 | 6/2003 | Deryugin et al. | 709/231 |
| 2003/0115545 A1 | 6/2003 | Hull et al. | 715/500 |
| 2003/0120395 A1 | 6/2003 | Kacel | 701/1 |

OTHER PUBLICATIONS

CentreVu® Advocate$^{SM}$ Research Simulation white paper; "CentreVu Advocate Research Simulation, Environments with CentreVu Advocate"; Lucent Technologies 1999.

CentreVu® Advocate; "Power Call Center Routing that Leaves *Nothing* to Chance"; Lucent Technologies 1998.

Foster, Robin Harris and De Reyt, Stanny; "Re-inventing the Call Centre with Predictive and Adaptive Execution"; The Journal of the Institution of British Telecommunication Engineers, vol. 18, Part 2, pp. 180-184 1999.

"C@ll Center Solutions—1998 Product of the Year"; http://www.praxon.com/news/art_2-99prodofyear.htm.

"Choosing the Best: *CTI*® Magazine's 1998 Products of the Year"; http:/www.tmcnet.com/articles/0199/ctipoty98.htm.

* cited by examiner

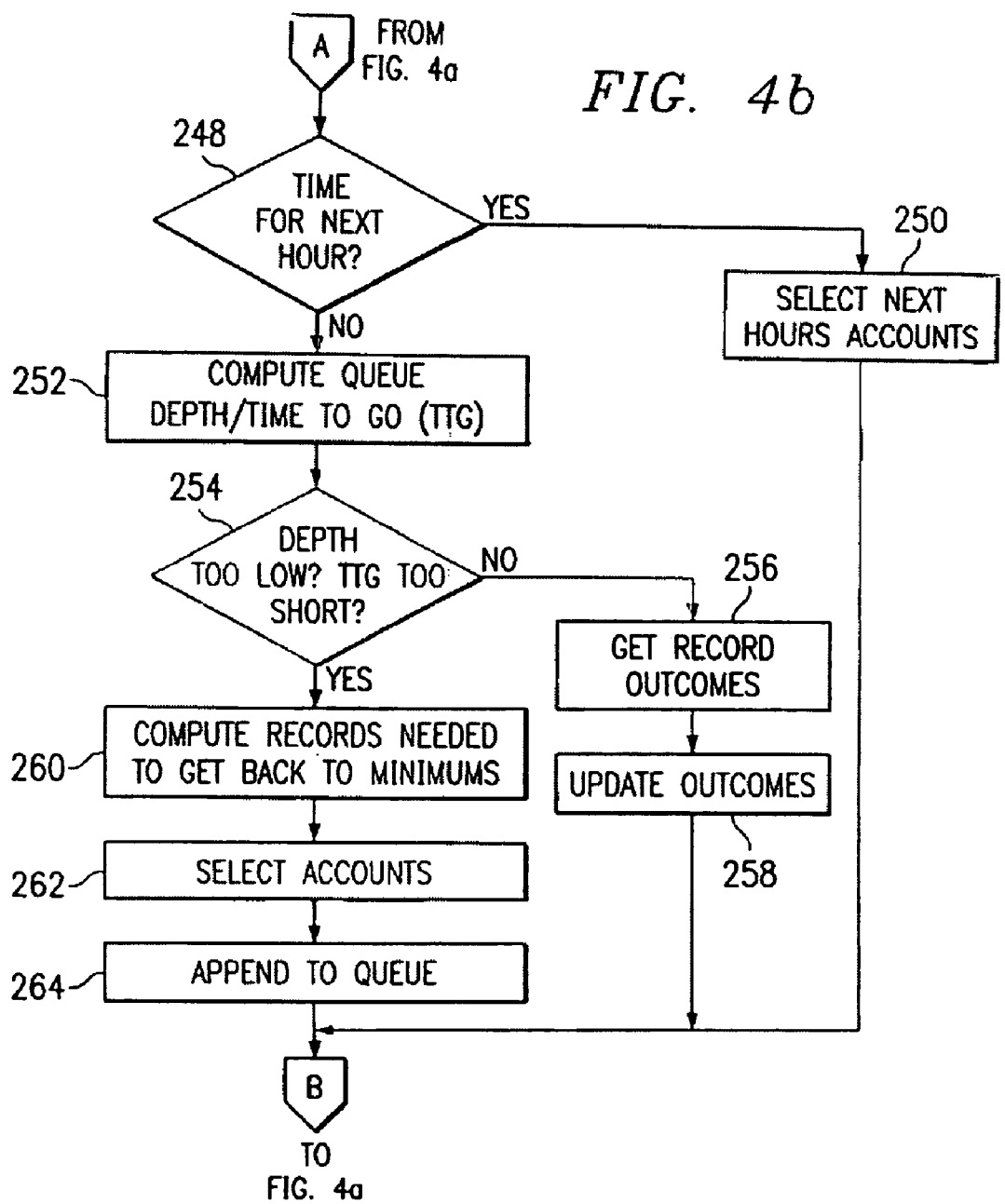

SYSTEM AND METHOD FOR UPDATING CONTACT RECORDS

RELATED PATENT APPLICATION

This application is a continuation-in-part of U.S. patent application Ser. No. 10/456,575 filed on Jun. 6, 2003 now U.S. Pat. No. 7,054,434 and entitled "System and Method for Common Account Based Routing of Contact Records," which is a continuation-in-part of U.S. patent application Ser. No. 10/095,513, filed on Mar. 12, 2002 now U.S. Pat. No. 7,103,173 and entitled "System and Method for Preemptive Goals Based Routing of Contact Records," which is a continuation-in-part of U.S. patent application Ser. No. 09/901,749 filed on Jul. 9, 2001 now U.S. Pat. No. 7,142,662 and entitled "Method and System for Distributing Outbound Telephone Calls."

TECHNICAL FIELD OF THE INVENTION

This invention relates to the field of telephony, computer networks, and customer relationship management, and more particularly to a system and method for common account based routing of contact records.

BACKGROUND OF THE INVENTION

Customer contact centers represent the front line for customer service, marketing operations, and debt collection for many businesses. Typical centers receive or make hundreds of telephone calls, emails, and Internet chat requests per day with the aid of automated telephony and Internet equipment. For instance, predictive dialers such as the MOSAIX Predictive Dialing System ("PDS") manufactured by Avaya Incorporated automatically dial outbound telephone calls to contact individuals and then transfer the contacted individuals to agents so the agent can talk with the individual.

Devices such as dialing devices, email servers, chat servers, VOIP servers, telephony servers, and web servers allow agents to save time in contacting customers and receiving requests from customers. Dialing devices such as predictive dialers save time for the agent placing the call because the dialing device and not the agent dials the telephone number and agents' time is not wasted with unanswered calls or answering machines. Predictive dialers also spread the outbound telephone calls evenly among all the agents working from the dialing device so that the agents share the workload equally and no agents sit idle while others have too many telephone calls to place. Predictive dialers are also a significant component of customer relationship management (CRM) systems which extend the efficiency gained from predictive dialers to other contact channels such as email and live Internet chat.

Many businesses are increasing their marketing efforts, customer service programs, and bad debt collection efforts by having multiple customer contact centers or call centers or multiple devices located at a single site to serve more customers. Typically, when businesses have multiple sites, the centers are located in different geographic locations which makes coordination of customer contact strategies difficult.

Thus businesses generally manage call centers individually, with separate staffing, calling strategies, goals, and functions. Generally, a contact list is divided into as many parts as there are call centers or dialers with each call center receiving its own section of the calling list. Although this segmentation distributes work, coordination of strategy for outbound calling is difficult since each call center is responsible for its own section of the calling list and has no knowledge of the other call centers' progression with their own calling lists. For instance, if a call center goes down and cannot make outbound telephone calls, the other call centers cannot typically address the downed call center's calling list goals and priorities because the other call centers do not have access to the calling list including the telephone numbers actually called.

A similar problem occurs with a single call center having multiple CRM systems having multiple devices. Work load segmentation typically occurs at a host level, where each device is assigned a portion of the work load. A host downloads the segmented contact list to the individual dialing devices. If one device fails, the other devices do not know the status of the contacts in the failed device's segment.

Difficulties also arise in the routing of outbound calls, call records, or contact records to the agents in a single calling center or multiple calling centers. Typically when routing calls, a call center employs categorization and prioritization routing or load leveling routing. With categorization and prioritization routing, the calls are categorized and prioritized before being sent to the call centers. All of the available call records are organized into distinct groups or pools and each pool of call records is prioritized according to a particular prioritizing scheme. A typical scheme often used at contact centers is to prioritize the inbound calls with the highest priority, live Internet chats second, outbound calls third, and email or other requests last. The agents are segregated into distinct teams and each team receives call records from a particular pool based on the prioritization of the call records.

Load leveling routing of call records allows multiple agent teams to work on the same group or pools of records whether the agents are located in the same call center or if the agents are located across multiple call centers. Load leveling routing eliminates the restriction of categorization and prioritization that requires distinct groups of records for agents not working from the same dialing device. This allows for the movement of call records between the agents and call centers.

However, none of the above call record routing techniques adjusts the agent and pool workload based on the performance or the performance goals of the call record pools. Generally, if a call record pool is not maintaining a desired performance, manual intervention by a system administrator is required to adjust for the under performing call record pool. In order to address the under performing call record pool, agents must move from one team to another in order to have the ability to access call records from the under performing pool and thereby improve the call record pool performance. But this is a slow process that typically results in agent and call center downtime and often cannot be made quickly enough to respond to current call record pool performance.

In addition, such manual intervention decisions to correct under performing call records pools typically require guess work and making decisions without considering all the available options and the effect on the other call record pools. The system administrator must guess as to the effects on the other call record pools when agents are moved from pools maintaining or achieving performance requirements to under performing pools. If agent moves are made incorrectly, then additional pools may start under performing due to the agents that were moved to the under performing pool. Therefore the performance of the call record pools requires constant supervision to ensure that by the end of the calling day the performance requirements for the highest priority pools are satisfied.

Another difficulty with attempts to coordinate calling campaigns across multiple contact device dialers and/or multiple contact calling centers is that a single individual sometimes has multiple accounts that result in multiple contact attempts to the individual for each account. For instance, an individual may have call records for a delinquent account, a marketing account for new sales and a service quality inquiry. As another example, a calling center may have contracts with multiple businesses to contact each business' delinquent accounts and the delinquent accounts of two or more businesses may share common individuals who are delinquent. In such instances, multiple call centers may simultaneously contact or attempt to contact the same individual for the different accounts. An individual targeted by multiple calling centers is more likely to feel harassed and less likely to cooperate or even respond to the call center inquiries. Multiple attempts to contact the same individual by different call centers result in greater outbound call volume and less effective use of outbound calling capacity.

Another difficulty with attempts to coordinate calling campaigns across multiple contact devices is that contact information is often inaccurate or outdated. For instance, with debt collection campaigns debtors generally do not update their contact information and, often, delinquent account holders intentionally avoid contact. Thus, debt collection contact attempts are often made to wrong numbers that are no longer in service or that are no longer associated with the party responsible for the debt. When the contact information associated with a responsible party is outdated or invalid, contact centers use a number of available resources to "skip trace" the responsible party and obtain valid contact information, such as directory assistance or third party' skip tracing services like FASTDATA from FDR. However, each look-up has an associated charge so that call centers generally attempt to control the cost and number of look-ups that are performed. Skip trace look-up costs are typically controlled by consolidating the bad numbers reached throughout a calling day or campaign and querying various skip trace resources manually or with automated batches to obtain numbers for subsequent attempts. In multi-dialer operations, consolidated skip trace look-ups help prevent multiple skip traces of the same responsible party, but tend to reduce the effectiveness of a campaign by restricting the responsiveness of a campaign when bad numbers are identified since subsequent attempts to contact the responsible party after the skip-trace lookup will generally occur in another campaign after the consolidated updates are performed.

SUMMARY OF THE INVENTION

Therefore, a need has arisen for a system and method that distributes contact records based on the performance of the pools of contact records.

A further need has arisen for a system and method that automatically monitors the performance of the pools and automatically adjusts the distribution of contact records based on the performance of the pools.

A further need exists for a system and method which coordinates contact attempts for related but separate contact record accounts.

A further need exists for a system and method which determines that contact information is outdated and coordinates look-up of current contact information.

In accordance with the present invention, a system and method for distributing contact records utilizing goals based routing is provided which substantially eliminates or reduces disadvantages and problems associated with previously developed systems and methods for distributing contact records. A goal module monitors the performance of one or more pools of contact records and automatically modifies the distribution of the contact records from the pools based on the performance of each pool.

In accordance with one aspect of the present invention, distribution of contact records utilizing goals based routing is accomplished by a distribution module interfaced with a plurality of devices. The distribution module includes a plurality of pools and a plurality of queues. The distribution module places contact records into the pools, transfers less than all of the contact records to the queues from the pools, and transfers the queues to the devices. Associated with the distribution module is a goal module. The goal module monitors the performance of each pool and modifies which queues the pools transfer contact records to based upon the performance of the pools.

In one embodiment, the goal module defines one or more levels of effort for each queue. The levels of effort determine the percentage of contact records that transfers from a pool to a particular queue. The goal module also determines a goal for each pool that reflects the performance of the pool and prioritizes the pools relative to each other. As the agents access the contact records from the queues, the goal module monitors the performance of the pools by calculating a goal status for each pool. The goal module uses the goal status to determine a goal state for each pool. The goal state indicates whether a pool is satisfying the goal. Based upon the goal states for each pool, the goal module modifies which queues the pools transfer contact records to by transferring the levels of effort between the pools and the queues.

In an alternate embodiment, the goal states and one or more goal strategies allow for the optimization of the transfer of contact records from the pools to the queues and determine how the goal module modifies which queues the pools transfer contact records to. The goal strategies control how levels of effort between the pools and queues are transferred when a pool is not satisfying the goal. A goal strategy may require the transfer of levels of effort to pools not satisfying their goals or the transfer of levels of effort away from pools not satisfying the goal. The goal module transfers levels of effort in accordance with the goal strategies so that pools having the highest priority maintain or achieve the goals throughout the day.

In another alternative embodiment, related call records are identified and marked with a relationship tag to coordinate actions for multiple related accounts before a contact attempt is made. This relationship tag may be applied in real-time before a call record is prepared for distribution or when a list of callable records is loaded into the system. A comparison engine analyzes the call records database of one or more call distribution modules to identify and tag related call record accounts, such as call record accounts that are related to a common individual. A common account tag detector associated with each contact device detects an individual relation tag associated with all similarly tagged call records and, before a contact attempt to the individual is made, communicates the relationship tag and related account information to the call distribution module. A common account controller of the call distribution module places a hold on other accounts related to the individual by placing a hold on call records having the relationship tag to prevent the placement of multiple calls to the individual once a call has been initiated. The common account controller routes the related account information (through the feed to the dialing device) to the operator handling the successful contact with the individual to allow simultaneous resolution of the related account call records through the single successful contact.

In another alternative embodiment, contact results of contact records received by the distribution module from contact devices, such as dialers, are analyzed by a contact update engine to determine whether to perform real time skip traces for records in which one or more contact attempts were not successful. The update engine analyzes a contact record's results with update factors, such as rules or modeling variables, to determine if the contact information, such as a telephone number, is outdated. If a contact records are inaccurate and business rules select the records for skip-trace lookup, they are forwarded to an update resource interface for update requests from one or more update resources, such as directory assistance or third party location services. The updated contact information is validated with an update validation engine and provided to a contact record database for real time distribution to contact devices to attempt contacts with the updated contact information.

The present invention provides a number of important technical advantages. One important technical advantage is the distribution of contact records based on the performance of the pools. The ability to distribute contact records based on the performance of the pools of contact records allows a call center to operate more efficiently because the call center recognizes when a pool is not sufficiently performing and redistributes the contact record workload to allow for more efficient operation thereby allowing higher priority pools to satisfy performance requirements.

Another important technical advantage of the present invention is the distribution of contact records based on the performance of the pools without manual intervention. The goal module monitors the performance of each pool and determines whether a pool is ahead, at, or behind the goal. When a pool is not satisfying a goal, the goal module automatically takes action to modify how the pools transfer contact records to so that the highest priority pools achieve or maintain the goals. Therefore, no manual intervention is required and pools are not adversely affected by the changes. In addition, because no manual intervention is required, there is reduced agent or device downtime when the goal module distributes the contact records based upon the performance of the pools.

Another important technical advantage of the present invention is the ability to quickly respond to current pool performance levels. Because the goal module constantly monitors the performance of the pools, the goal module may instantly react to any change in the performance of the pools throughout the day. And because the goal module monitors the performance of all the pools and has the goal states for every pool, when the goal module modifies the distribution of contact records, the goal module takes into account the effects of the modification on the goals for all of the pools so that the highest priority pools achieve or maintain the goals. Therefore, the guess work in distributing contact records based on the performance of the pools is reduced and there are no unexpected results at the end of the day.

Another important technical advantage of the present invention is that multiple related call record accounts are handled through a single successful contact attempt. The related account call records are identified and tagged in a predetermined field or database column so that contact devices are able to record a successful contact attempt to all call records. The call distribution device common account controller leverages the successful contact to handle multiple call record accounts related to the same individual without undue delay in transferring the related account information to the contact operator. This reduces outbound call volume by eliminating multiple calls to the same individual and more effectively uses outbound calling resources to improve the distribution of resources across related and unrelated accounts. Further, by handling multiple call record accounts in a single call to an individual, an operator has greater leverage in resolving business issues with the individual. For instance, an operator generally has greater bargaining power when dealing with an individual over multiple delinquent accounts than a single delinquent account.

Another example of a technical advantage is that a skip trace update process automatically integrates contact information updates with a distribution module to allow real time updates to contact information in support of a contact campaign. Real time updates allow reactions to no contact results as a campaign progresses rather than awaiting intermediate batch processes of no contact results. Campaign effectiveness is further enhanced with selection of contact records for updates based on predetermined criteria, such as rules that define outdated contact information or models that compare contact information update cost with expected results, such as predicted collections from updated contact records. Coordinating updates through the distribution module reduces expenses from repetitive updates and allows selection of update resources to reduce costs and enhance update accuracy.

BRIEF DESCRIPTION OF THE DRAWINGS

For a more complete understanding of the present invention and the advantages thereof, reference is now made to the following description taken in conjunction with the accompanying drawings in which like reference numbers indicate like features, and wherein:

FIGS. 4a and 4b illustrate a flow diagram for the population of the pools and queues with call records;

DETAILED DESCRIPTION OF THE INVENTION

Preferred embodiments of the present invention are illustrated in the figures, like numeral being used to refer like and corresponding parts of the various drawings.

Under previous systems and methods for routing contact records, the redistribution of contact records among the devices and agents based upon the performance of the of the different pools of contact records required manual intervention often involving guesswork as to the effects of performance based changes, the shutting down of the devices, starting a new job on the device, or moving agents between the devices. The goal module of the present invention allows for the routing of contact records across one or more than one device based on the performance of the individual pools of contact records quickly and without manual intervention. The goals based routing of contact records allows for dynamically modifying the distribution of contact records based on the performance of the pools of contact records throughout the day without manual intervention, down time, and guesswork.

The present invention allows for the routing and distribution of contact records among a plurality of devices and agents based upon the performance of the different pools of contact records. Contact records include such customer contacts as outbound telephone calls, inbound telephone calls, call records, emails, Internet chat requests, online chat requests, and any other appropriate form of customer contact. Devices include such call center or contact center devices as dialing devices including predictive dialers, email servers, Internet chat servers, VOIP servers, telephony servers, web servers, and any other appropriate call center or contact center devices. In the figures below, reference is made to call records and dialing devices but the present invention equally applies to the other types of contact records and devices listed above.

Figure 1:
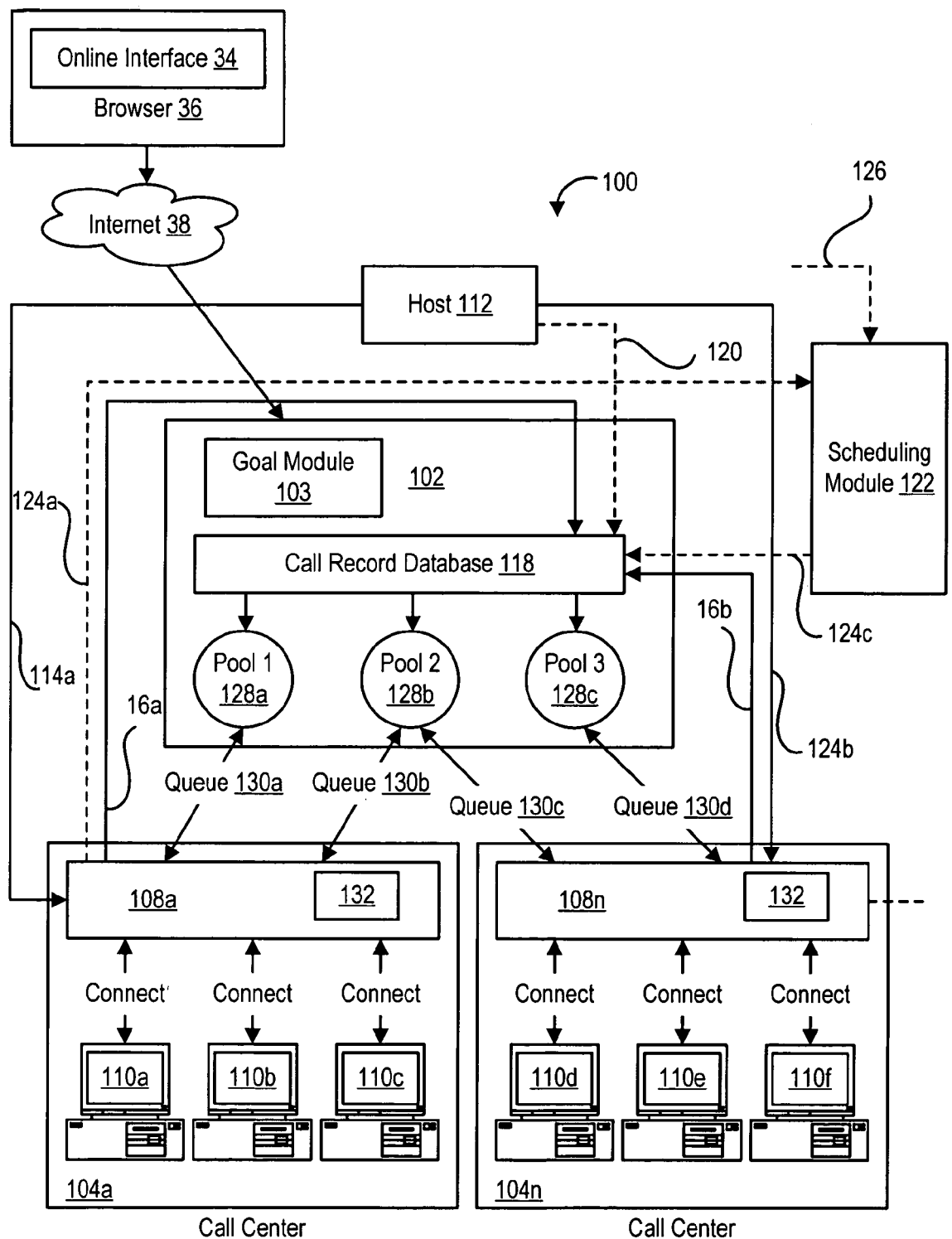
FIG. 1 depicts a block diagram of plural dialing devices interfaced with a distribution module.

FIG. 1 depicts a block diagram for an outbound distribution system 100 for distributing outbound telephone calls employing goals based routing. A distribution module 102 interfaces with a first call center 104a and a second call center 104n. System 100 allows call centers 104a and 104n to operate as a single group of resources rather than two decentralized units, with distribution module 102 controlling the strategy, workload, and calling efforts for call centers 104 from a single, central location. In alternative embodiments, distribution module 102 interfaces with multiple dialing devices at one or more call centers, or one dialing device located in one call center.

Call centers 104 are geographically distributed, each having one or more dialing devices that place telephone calls using information in the call records. Distribution module 102 operates on a SOLARIS, Linux, or an any other appropriate operating system server and communicates with call centers 104 via standardized communications links such as Ethernet, the Internet with protocols such as FTP, CORBA, API, and sockets over TCP/IP, asynchronous transfer mode ("ATM"), or any other appropriate communication link.

Call centers 104 each have one or more dialing devices 108. Dialing devices 108 are predictive dialers such as the MOSAIX PDS manufactured by Avaya Incorporated or other appropriate predictive dialers. In the embodiment shown in FIG. 1, interfaced to dialing device 108a in call center 104a are three agents 110a, 110b, and 110c with dialing device 108n of call center 104n also having three agents 110d, 110e, and 110f interfaced to it. Agents 110 are workstations where operators or agents speak to the individuals, chat with individuals online, complete emails to, or otherwise contact individuals who are contacted by dialing devices 108.

Dialing device 108 dials telephone numbers extracted from the call records. If an individual answers the telephone, dialing device 108 transfers the telephone call to one of agents 110 so that the agent can speak with the individual. Dialing devices 108 therefore improve telephone calling efficiency by dialing the telephone number and transferring the call to an agent only if an individual answers the telephone.

System 100 functions by first having distribution module 102 acquire the call records that dialing devices 108 will call. There are several different ways that distribution module 102 acquires the call records.

For instance, host 112, which is associated with dialing devices 108, stores raw call records. The raw call records contain information including telephone number, account number, individual name and address, and any other appropriate personal information. For example, a raw call record for Joe Smith includes Joe Smith's telephone number, mailing address, account status, account number, account passwords, gender, marital status, number of children, employment status, and yearly income.

Host 112 transfers the raw call records for that day along path 114a to call center 104a and dialing device 108a and along path 114b to call center 104n and dialing device 108n. Distribution module 102 contacts dialing device 108a within call center 104a via path 116a and dialing device 108n within call center 104n via path 116b. Distribution module 102 downloads from dialing devices 108 to call record database 118 the call records. The call records may contain some but not all of the information from the raw call records. Downloading less than all of the information from the raw call records saves bandwidth and allows for efficient operation of distribution module 102 because it handles smaller amounts of data. For instance, distribution module 102 downloads as the call record an individual's name, telephone number, and account number. So the call record for Joe Smith contains Joe Smith's name, his telephone number, and account number.

In an alternative embodiment, host 112 stores the raw call records. Instead of transferring the raw call records to dialing devices 108, distribution module 102 downloads the call records from host 112 to call record database 118 via path 120.

Alternatively, dialing devices 108 store the raw call records. Therefore, distribution module 102 contacts call center 104a and dialing device 108a via path 116a and call center 104n and dialing device 108n via path 116b to download the call records to call record database 118.

Scheduling module 122 operates to develop and provide optimal calling strategies for the call records including resource optimization, automated statistical modeling and flexible strategy management. For instance, one such scheduling module 122 is described in U.S. Pat. No. 5,802,161, entitled "Method and System for Optimized Scheduling" issued Sep. 1, 1998, and is hereby incorporated by reference.

The integration of scheduling module 122 is not required for the operation of distribution module 102 but it affects how distribution module 102 downloads the call records and what information is contained in the call records. For instance, host 112 transfers the raw call records to call center 104a and dialing device 108a via path 114a and call center 104n and dialing device 108n via path 114b. Scheduling module 122 downloads from dialing device 108a in call center 104a via path 124a and from dialing device 108n in call center 104n via path 124b the raw call records. Scheduling module 122 develops call schedules for the raw call records. Distribution module 102 downloads the call records including the call schedule from scheduling module 122 via path 124c and stores the call records in call record database 118.

Alternative embodiments also employ scheduling module 122 in the delivery of call records to distribution module 102. Scheduling module 122 downloads the raw call records from host 112 via path 126. As before, scheduling module 122 adds call schedules to the raw call records before distribution module 102 downloads the call records from scheduling module 122 via path 124c to call record database 118.

Once distribution module 102 stores the call records in call record database 118, distribution module 102 organizes and transfers the call records from call record database 118 to pools 128, which are interfaced with distribution module 102. The pools are sets of callable call records specified by distribution module 102. Each pool 128 represents a specific and ordered group of call records. In the embodiment shown in FIG. 1, there are three pools 128a, 128b, and 128c. In alternative embodiments there can be more than three or less than three pools.

Distribution module 102 then transfers less than all of the call records from pools 128 to queues 130. Interfaced with pools 128 are queues 130a, 130b, 130c, and 130d. A queue is a set of rules for selecting call records from pools having the necessary and sufficient information describing the exact method of transferring call records to dialing devices 108 and any call records assigned to but not yet transferred to dialing devices 108 for dialing devices 108 to call. Distribution module 102 attaches each queue 130 to a particular dialing device 108 and monitors each dialing device. As necessary, distribution module 102 transfers call records from pools 128 in accordance with the configuration of queues 130 which includes selection rules, time of day, time of week, number of calls completed, and number of call records sent. Queues 130 then transfer the call records to their assigned dialing devices 108. For instance, distribution module 102 transfers call records according to the configuration of queues 130a and 130b to dialing device 108a of call center 104a and according to the configuration of queues 130c and 130d to dialing device 108n of call center 104n.

In addition, each queue 130 is associated with a single campaign for the dialing device to which it is assigned. A campaign is an outbound job calling on dialing device 108 that can receive additional call records for calling while the outbound calling job is active. Normally, a campaign on dialing device 108 continues to run until manually stopped or when it runs out of call records to dial.

Pools 128 can satisfy transfer requests for call records for one or more than one queue 130. For example, pool 128a transfers call records to queue 130a, pool 128b transfers call records to queues 130b and 130c, and pool 128c transfers call records to queue 130d. In addition, distribution module 102 can change the queues which request call records from pools 128 throughout the day and in the middle of outbound calling campaigns. For instance, if dialing device 108n located in call center 104n calls all the call records in pool 128c, then distribution module 102 can request that pools 128a and 128b transfer call records to queue 130d.

Distribution module 102 transfers the call records to pools 128, transfers less than all of the call records from pools 128 to queues 130, and transfers queues 130 to dialing devices 108 before dialing devices 108 begin their daily calling routines. At the beginning of the day, distribution module 102 transfers enough call records from pools 128 to queues 130 to allow for dialing devices 108 to place calls for fifteen, thirty, sixty minutes, or an appropriate amount of time to place calls. Distribution module 102 monitors the calls placed by dialing devices 108 as well as the number of call records remaining to be called to determine how busy dialing devices 108 are and when and how many additional call records to transfer from pools 128 to queues 130. The monitoring of queues 130 and the transferring of additional call records from pools 128 to queues 130 allows for real-time movement of call records from distribution module 102 to dialing devices 108 throughout the day. For instance, as soon as dialing device 108a is about to finish calling the call records in the campaign assigned to queue 130a, distribution module 102 transfers additional call records from pool 128a to queue 130a so that dialing device 108a maintains a steady and level flow of work.

Dialing devices 108 also track the call attempt results of every call placed by dialing devices 108. The call attempt results include whether or not a call resulted in a right party contact, a wrong party contact, no answer, or an answering machine. For example, the objective of a call record for Joe Smith is to talk with Joe Smith. If agent 110 speaks with Joe Smith, that is a right party contact and a successful call attempt result. If Joe's babysitter answers the phone and Joe is not home, that is a wrong party contact and an unsuccessful call attempt result. If no one answers the phone or an answering machine answers the phone, that is an unsuccessful call attempt result since the desired party was not contacted. Therefore throughout the day, distribution module 102 queries dialing devices 108 for call attempt results and uploads the call attempts results. If a call attempt result is unsuccessful, then distribution module 102 updates the call record in pools 128 so that a dialing device 108 may call the call record again at a later time in the day.

An advantage to system 100 is that distribution module 102 controls the transfer of the call records which results in a level work flow for dialing devices 108. To enable better work flow control, queues 130 include selection rules that determine how distribution module 102 transfers call records from pools 128 to queues 130. The selection rules allow for the optimization of the transfer of call records from pools 128 to queues 130 and include priority rules, percentage rules, quotas, queuing theory rules, or any other appropriate rules for optimizing the transfer of call records from pools 128 to queues 130. The selection rules can be modified on an as needed basis.

Priority rules result in distribution module 102 transferring call records from pools 128 to queues 130 based upon an assigned priority for each pool 128. For example, queue 130a receives call records from pools 128a and 128b with pool 128a having priority over pool 128b. Queue 130b receives call records from pools 128a and 128b with pool 128b having priority over pool 128a. Assume that pool 128a arrives at 8:00 AM while pool 128b arrives at 9:00 AM. Initially, both queues 130a and 130b receive call records from pool 128a. At 9:00 AM when pool 128b arrives, queue 130a continues to receive call records from pool 128a while queue 130b receives call records from pool 128b.

Percentage rules result in distribution module 102 simultaneously transferring call records from pools 128 to queues 130. For example, queue 130c has a percentage configuration with pools 128b and 128c and queue 130d has a percentage configuration with pools 128b and 128c. In this configuration, queue 130c and 130d receive call records simultaneously from pools 128b and 128c. With pool 128b arriving at 8:00 AM and pool 128c arriving at 9:00 AM, at 8:00 AM both queues 130c and 130d receive call records from pool 128b. At 9:00 AM, queues 130c and 130d alternatively receive call records from pools 128b and 128c. The percentages are variable for instance so that queue 130c receives 80% of its call records from pool 128b and 20% of its call records from pool 128c while queue 130d receives 60% of its call records from pool 128b and 40% of its call records from pool 128c.

The selection rules can also incorporate the execution of an optimization module which will determine the optimal mix of call records from each of the available pools 128 based on the optimization constraints and the number of call records needed at the current time.

The selection rules can also incorporate pool quotas which are limits set on each pool controlling a maximum activity level such as number of records transferred, number of successful call attempts, and other appropriate indicators of call record activity. When distribution module 102 transfers call records to pools 128, distribution module 102 can also set quotas on how many call records dialing devices 108 will call from pools 128. In the percentage rule example above, distribution module 102 can place a quota on pool 128b. When dialing devices 108 satisfy the quota for pool 128b, queues 130c and 130d no longer receive call records from pool 128b and only receive call records from pool 128c.

The selection rules can also be a combination of the percentage rules and the priority rules. For example, queue 130b receives call records from all three pools 128a, 128b, and 128c. Queue 130b receives call records from pool 128b until dialing device 108a calls all the call records in pool 128b. At that time, queue 130b then alternately receives call records from pools 128a and 128c. As with the percentage rules above, queue 130b can receive call records from pools 128a and 128c in any percentage breakdown. Therefore, pool 128b has priority over pools 128a and 128c while pools 128a and 128c transfer call records using percentage rules.

In addition, these selection rules allow for skills-based routing between pools 128. For example, distribution module 102 allows pool 128a to initially transfer call records to queue 130a and pool 128c to initially transfer call records to queue 130d. If pool 128c becomes depleted and has no more call records to transfer to queue 130d, then pool 128a can begin transferring call records to both queues 130a and 130d. This allows distribution module 102 to transfer call records for easy to moderate difficulty customers to the best agents while the less skilled agents work the more difficult customers. And once the easy to moderate difficulty customers call records are depleted, the best agents can begin working the more difficult customer call records.

In addition, distribution module 102 may also route call records to dialing devices 108 and agents 110 based on the performance of pools 128. Routing the call records based on the performance of pools 128 allows distribution module 102 to make modifications so that pools 128 having a higher priority are not under-performing. Goal module 103, associated with distribution module 102 and pools 128, monitors the performance of pools 128. To monitor the performance of pools 128, either a user of system 100 or goal module 103 defines a performance metric for each pool 128. Once the performance metric is defined, goal module 103 applies the performance metric to pools 128. The performance metric is what goal module 103 uses to measure the performance of pools 128. For example, the performance metric for pool 128a may be the number of right party contacts while the performance metric for pool 128b is the number of accounts attempts and the performance metric for pool 128c is the number of call records attempted. Each pool 128 may have a different performance metric or pools 128 may have the same performance metric. In addition, each of the pools 128 may have more than one performance metric. For instance, pool 128a may have both a performance metric for the number of right party contacts and for the number of total accounts attempted.

Once goal module 103 has determined a performance metric for each pool 128, goal module 103 defines a goal for each pool 128. The goal can be either an absolute goal or a goal set relative to all the other pools 128. An absolute goal is a goal tied solely to the performance of the particular pool 128 while a relative goal is tied to the performance of all pools 128. In addition, the goal is related to the selected performance metric. For instance, pool 128a having a performance metric of number of right party contacts may have a goal of fifty right party contacts while pool 128c having a performance metric of number of call records attempted has a goal of one hundred call records attempted.

If a pool 128 has more than one performance metric, then the pool 128 will have a goal for each performance metric. For example, if pool 128a has a performance metric for number of right party contacts and for total number of accounts attempted, pool 128a may have a goal of 80 right party contacts and 200 accounts attempted. In addition, a pool 128 may also have a combination of goals where there pool 128 only needs to satisfy one of the goals. For instance, pool 128b may have a goal of 75 right party contacts or 200 accounts attempted and as long as pool 128b has at least 75 right party contacts or 200 accounts attempted, pool 128b is considered to be satisfying its goal and experiencing satisfactory performance.

The goals may also be end of day goals, mid-day goals, and rate based goals. End of day goals are goals calculated based on the performance of a pool 128 at the end of the day and include such goals as total number of call records attempted and number of right party contacts. Mid-day goals are similar to end of day goals but are calculated based on the time of day. For example, pool 128a may have a mid-day goal of twenty-five right party contacts by noon. Rate based goals are calculated as a rate of the total calls. For instance, if pool 128a has a performance metric of right party contact rate, a rate based goal may be 15% of all the call records from pool 128a should result in a right party contact.

Similar to the selection rules, goal module 103 defines or constrains levels of effort for each queue 130. The levels of effort detail the percentage of call records that transfer from a particular pool 128 to a particular queue 130. The levels of effort are stored in an effort map associated with goal module 103. Table 1 shows an example effort map for system 100. An examination of the effort map shown in Table 1 reveals that queue 1 (queue 130a) has a level of effort of 100% to pool 1 (pool 128a) meaning queue 130a receives all of its call records from pool 128a. Queue 2 (queue 130b) has a level of effort of 100% to pool 2 (pool 128b) meaning queue 130b receives 100% of its call records from pool 128b. Queue 3 (queue 130c) has a level of effort of 100% to pool 2 (pool 128b) meaning queue 130c receives 100% of its call records from pool 128b. Queue 4 (queue 130d) has a level of effort of 100% to pool 3 (pool 128c) meaning that queue 130d receives 100% of its call records from pool 128c. Therefore, 100% of the call records in pool 128a transfer to queue 130a, the call records in pool 128b transfer equally to queues 130b and 130c, and 100% of the call records in pool 128c transfer to queue 130d.

TABLE 1

Example Effort Map

|  | Pool 1 | Pool 2 | Pool 3 |
|---|---|---|---|
| Queue 1 | 100% | 0% | 0% |
| Queue 2 | 0% | 100% | 0% |
| Queue 3 | 0% | 100% | 0% |
| Queue 4 | 0% | 0% | 100% |

As pools 128 begin to transfer call records to queues 130 and agents 110 access the call records, goal module 103 calculates a goal status for each pool 128. The goal status can be defined as either the absolute difference between the actual metric and the goal or the percentage that a pool 128 is either ahead or behind its goal. For instance, if each pool 128 has a goal of fifty right party contacts and pool 128a has forty-five right party contacts, pool 128b has forty-eight right party contacts, and pool 128c has sixty right party contacts, then pool 128a has a goal status of −10%, pool 128b has a goal status of −4%, and pool 128c has a goal status of +20% for percentage based goals. Pool 128a has a goal status of −5, pool 128b has a goal status of −2 and pool 128c has a goal status of +10 for absolute difference based goals.

Goal module 103 uses the goal status for each pool 128 to determine a goal state for each pool 128. Pools 128 will have a goal state for each goal. An example definition of goals states would include the designation of ahead of goal, at goal, or behind goal. Goal module 103 or a user of system of 100 determines what thresholds define each of the available goal states. For example, if the goal states have been defined as ahead of goal, at goal, or behind goal, then a goal status of +10% and above may be ahead of goal, a goal status between +10% and −5% may be at goal, and a goal status of −5% and below may be behind goal. Given these threshold percentages and the goal status for pools 128, pool 128*a* has a goal state of behind goal (−10%), pool 128*b* has a goal state of at goal (−4%), and pool 128*c* has a goal state of ahead of goal (+20%). Any pool 128 that has a goal state of behind goal is said to be an under-performing pool and therefore experience unsatisfactory performance.

Similar to the pool quotas described above, goal module 103 also identifies and defines a final goal for each pool 128. A user of system 100 may also define the final goals for each of the pools 128. When a pool 128 satisfies its final goal, that pool 128 is no longer active and all the queues 130 that were receiving call records from that pool 128 now receive call records from the other pools 128 that have not satisfied their final goals. For instance, pool 128*a*-128*c* each have a final goal of eighty right party contacts. At 3:00 PM, pool 128*a* achieves eighty right party contacts. Because pool 128*a* has achieved its final goal, it becomes inactive and the call records from pool 128*a* are no longer transferred to queue 130*a*. To prevent queue 130*a* and agents 110 who access call records from queue 130*a* from becoming inactive, goal module 103 modifies which queues 130 pools 128*b* and 128*c* transfer call records to by allowing pools 128*b* and 128*c* to transfer call records to queue 130*a*. Since pools 128*b* and 128*c* have not reached their final goals, they are still active and queues 130 and agents 110 who were receiving call records from pool 128*a* now receive call records from pools 128*b* and 128*c*.

Before distribution module 102 begins to transfer queues 130 containing the call records to dialing devices 108, goal module 103 prioritizes pools 128 relative to each other. Certain pools 128 may contain call records that are of a higher priority than other pools 128. For example, pool 128*a* may contain call records for customers who have previously purchased products, pool 128*b* may contain call records for customers who have never purchased products, and pool 128*c* may contain call records for customers who are delinquent in paying for products previously purchased. Since a company's highest priority may be to collect the money it is owed, goal module 103 rates pool 128*c* with the highest priority while pool 128*a* has the second highest priority since it contains call records for customers with whom there is a previous relationship. Pool 128*b* has the lowest priority since it contains call records for potential customers. The prioritization of pools 128 enables goal module 103 to adjust the workload of agents 110 so that pools 128 having the highest priority achieve and maintain their goals throughout the day.

Goal module 103 modifies the distribution of call records using the goals of pools 128 by modifying which queues 130 pools 128 transfer call records to based on the performance and prioritization of pools 128. Goal module 103 modifies which queues 130 pools 128 transfer call records to by adjusting or transferring the levels of effort between pools 128 and queues 130. For example, pool 128*a* is of a higher priority than pool 128*c* and pool 128*a* is behind goal. Using the effort map shown in Table 1, queue 130*a* receives 100% of its call records from pool 128*a* and queue 130*d* receives 100% of its call records from pool 128*c*. Since pool 128*a* is of a higher priority, goal module 103 transfers level of effort from pool 128*c* to pool 128*a* so that queue 130*d* receives 50% of its call records from pool 128*c* and 50% of its call records from pool 128*a* while queue 130*a* still receives 100% of its call records from pool 128*a*. The example effort map shown in Table 2 illustrates which queues 130 pools 128 supply call records to after goal module 103 modifies the distribution of call records. Transferring some of the level of effort from pool 128*c* to pool 128*a* allows agents 110 who work queue 130*d* to work call records from pool 128*a* and thereby increase the number of agents 110 accessing call records from pool 128*a* so that pool 128*a* may satisfy its goal.

TABLE 2

Example Effort Map

| | Pool 1 | Pool 2 | Pool 3 |
|---|---|---|---|
| Queue 1 | 100% | 0% | 0% |
| Queue 2 | 0% | 100% | 0% |
| Queue 3 | 0% | 100% | 0% |
| Queue 4 | 50% | 0% | 50% |

To aid in the distribution of call records based on the performance of pools 128, goal module 103 employs one or more goal strategies. The goal strategies allow for the optimization of the transfer of call records from pools 128 to queues 130 and help to determine how goal module 103 transfers the levels of effort between pools 128 and queues 130. There are different goal strategies that goal module 103 may implement when distributing the call records based on the performance of pools 128. Goal module 103 may automatically select the goal strategy based upon the call records or a user of system of 100 may select an appropriate goal strategy.

One goal strategy is a meet-goals strategy. With the meet-goals strategy, goal module 103 transfers levels of effort to pools 128 that are not meeting their goals (a goal state of behind goal) and therefore are experiencing unsatisfactory performance. For example, if pool 128*a* is behind goal and pool 128*b* is ahead of goal, goal module 103 transfers levels of effort from pool 128*b* to pool 128*a* so that queues 130*b* and 130*c* also receive call records from pool 128*a*. A number of right party contacts performance metric is a performance metric that might be managed with the meet-goals goal strategy.

Another goal strategy is an exceed-goals strategy. With the exceed-goals strategy, goal module 103 transfers levels of effort away from pools 128 that are not meeting their goals (a goal state of behind goal) and therefore have unsatisfactory performance. For instance, if pool 128*b* is behind goal and pool 128*c* is at goal, goal module 103 transfers levels of effort from pool 128*b* to pool 128*c* so that queues 130*b* and 130*c* begin to receive call records from pool 128*c*. A right party contact rate performance metric is a performance metric that might be managed using the exceed-goals goal strategy.

To insure that lower priority pools 128 do not become neglected when goal module 103 routes call records based on the performance of pools 128, goal module 103 sets preemptive limits on how much level of effort may be transferred away from pools 128. These preemptive limits are stored in routing tables of which each pool 128 has its own routing table stored in goal module 103. An exemplary routing table for pool 128*a* is shown in Table 3. In the example routing table of Table 3, if pool 128*a* is ahead of goal, then pool 128*a* is willing to forego 75% of its total level of effort to pools 128 that are at a higher priority that need additional levels of effort. Pool 128*a* is willing to forego 50% of its total level of effort to pools 128 that are at the same priority that need effort if pool 128*a* is ahead of goal. Pool 128*a* is willing to give up 25% of its total level of effort to pools 128 that are of lower priority if needed if pool 128*a* is ahead of goal. The percentages are then set at 40%, 25% and 15% if pool 128*a* is currently at goal. If pool 128*a* is behind goal, pool 128*a* will only give up 25% of its level of effort and only to a pool 128 of higher priority. Each pool 128 has its own routing table and the percentages may vary depending on the number of pools, the number of call records, or any other appropriate factors.

TABLE 3

Example Routing Table

|  | Ahead | At | Behind |
|---|---|---|---|
| Higher Priority | 75% | 40% | 25% |
| Same Priority | 50% | 25% | 0% |
| Lower Priority | 25% | 15% | 0% |

In an alternate embodiment, the goal states and one or more goal strategies are inputs to and determine the objective functions and the constraints for an optimized solution to the routing determination problem. The goal strategies control how constraints on the levels of effort between pools 128 and queues 130 are relaxed or tightened when a pool 128 is not satisfying the goal. A goal strategy may allow for the transfer of higher levels of effort to pools 128 not satisfying their goals or allow for the transfer of higher levels of effort away from pools 128 not satisfying the goal. The goal module adjusts the level of effort constraints in accordance with the goal strategies so that pools 128 having the highest priority maintain or achieve the goals throughout the day.

In case of a communication, dialing device, or call center outage, system 100 employs contingency modules 132 for each dialing device 108. Contingency modules 132 are associated with dialing devices 108. Contingency modules 132 secure the call records within their respective dialing devices 108 in case of an outage. Before distribution module 102 transfers the call records to pools 128, distribution module 102 creates call record accounts for dialing devices 108, locks the call record accounts to dialing devices 108, creates a contingency download file, and stores the contingency download file in contingency modules 132. Distribution module 102 updates the contingency download file with call attempt results which prevents dialing devices 108 from calling call records already successfully called.

Users of system 100 control the functionality of distribution module 102 and goal module 103 through a user interface. The user interface is shown as online interface 134 in FIG. 1 but can be any appropriate type of user interface. Online interface 134 is a graphical user, platform-independent, password-protected World Wide Web ("WWW") browser-based interface. Users use online interface 134 to control the settings for distribution module 102 including goal module 103 including application of the selection rules, number of pools, and number of call records to initially transfer to the queues, generate reports, select goal strategies, select performance metrics, select the goals for the pools, define the goal states, modify the effort map and routing tables, and create and modify enterprise parameters. Users access online interface 134 by using browser 136 to access Internet 138 to reach a specific web address. Once at the specific web address, the users enter the appropriate passwords to gain access to online interface 134.

Although the embodiment shown in FIG. 1 contains more than one dialing device, in alternative embodiments distribution module 102 interfaces with a single dialing device. A single dialing device interfacing with distribution module 102 allows for variable control over similar lists of call records. For instance, call records may be divided into geographies such as states or time zones. Calling can be stopped automatically by distribution module 102 when a quota is reached for a particular geography. Distribution module 102 presents the similar lists of call records for different geographies as different pools but the similar lists of call records for different geographies would represent one calling job within the single dialing device.

Figure 2:
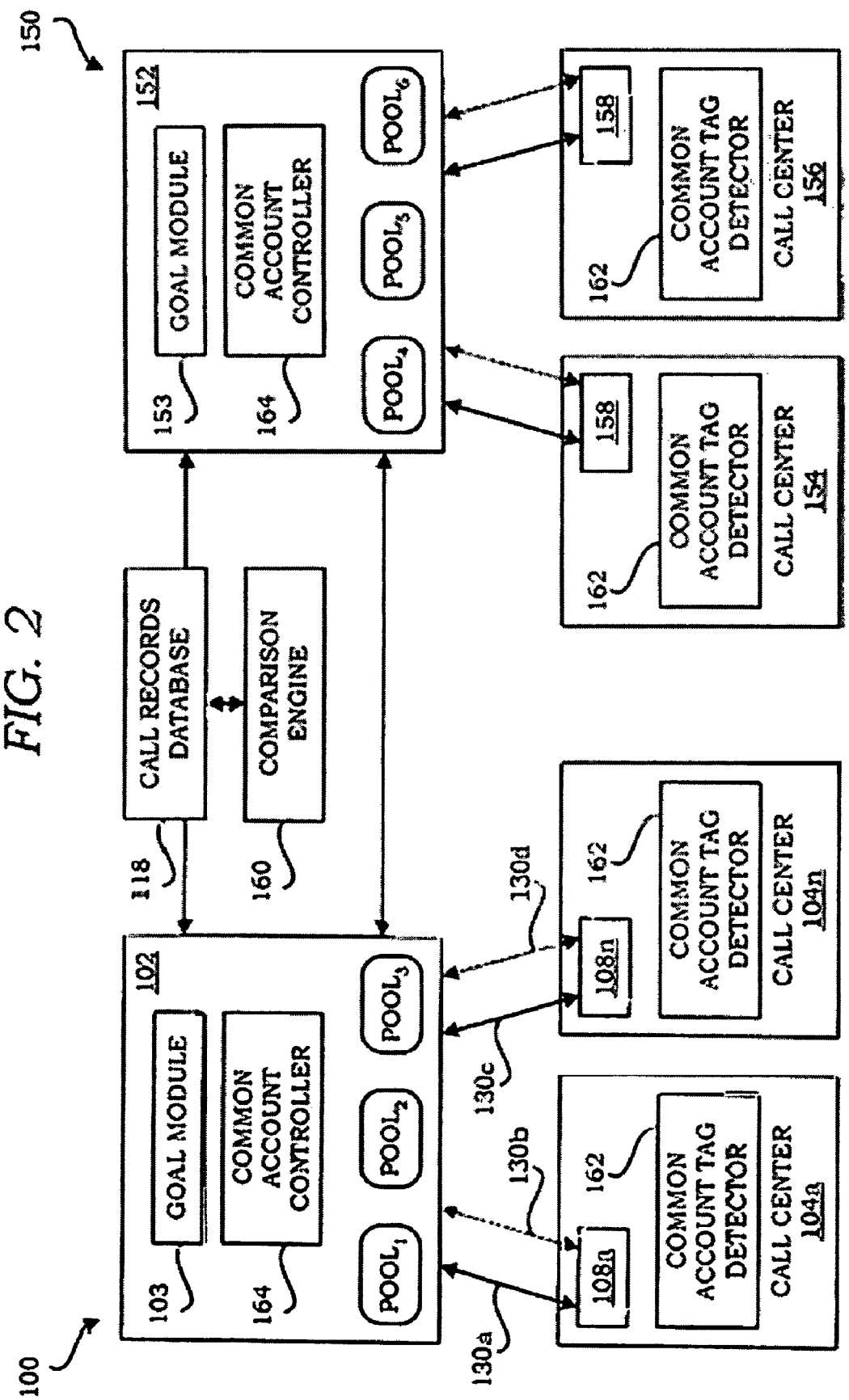
FIG. 2 illustrates a block diagram of another embodiment of the present invention employing two distribution modules having common account controllers.

FIG. 2 illustrates a block diagram of system 150 employing two distribution modules in an alternative embodiment of the present invention. System 100 as shown in FIG. 2 is shown with less detail than in FIG. 1.

System 150 employs two distribution modules 102 and 152. Distribution module 152 is associated with two call centers 154 and 156. Call centers 154 and 156 each have one dialing device 158. Distribution module 152 provides the same functionality to call centers 154 and 156 that distribution module 102 provides to call centers 104 as described above in the discussion regarding FIG. 1.

Distribution module 152 provides redundancy and prevents distribution module 102 from being overburdened by too many dialing devices. Distribution module 102 functions effectively with more than one dialing device interfaced with it but performance and efficiency suffers when too many dialing devices are attached. Therefore, additional distribution module 152 allows for both it and distribution module 102 to achieve optimal performance and efficiency when adding additional call centers 154 and 156 with additional dialing devices 158.

In system 150, distribution modules 102 and 152 are in communication with each other including communicating which call records are in the pools and the call attempt results. Distribution modules 102 and 152 transfer call records and call attempt results between themselves just as distribution module 102 transfers call records and call attempt results between dialing devices 108. Therefore, if dialing devices 158 are idle while dialing devices 108 are overburdened, distribution module 102 transfers call records to distribution module 152 for dialing devices 158 to call. In addition, if distribution module 152 experiences an outage, distribution module 102 transfers the high priority calls from distribution module 152 to dialing devices 108 without worry of calling the same call record a second time in the same day when the first call resulted in a right party contact.

The two distribution modules 102 and 152 of system 150 also each include a goal module 103 and 153. Goal module 153 provides the same functionality to call centers 154 and 156 that goal module 103 provides to call centers 104 as described above in the discussion regarding FIG. 1. Goal modules 103 and 153 are in communication with each other including communicating the performance of their respective pools and queues. Through the use of distribution modules 102 and 152, goal modules 103 and 153 can transfer levels of effort between their respective pools just as goal module 103 transfers levels of effort between pools 128. Therefore if high priority pools 128 are not meeting their goals, then goal module 153 can transfer levels of effort from distribution module 152 so that the high priority pools 128 will achieve their goals.

Distribution modules 102 and 152 manage calls from a common database 118 that lists call record accounts for outbound contacts by dialing. In order to identify related call record accounts for more effective handling of the outbound campaign or campaigns, a comparison engine 160 interfaces with call records database 118 to analyze and tag related call record accounts. For instance, comparison engine 160 relates multiple accounts to a single individual by comparing predetermined factors for common values, such as name, phone number, account number, social security account number, or other factors. Each set of related accounts is tagged with a relationship tag in a predetermined call record field so that a search for that tag value will locate all related call record accounts. As an example, distribution module 102 runs contact campaigns to collect delinquent electric bills and distribution module 153 runs contact campaigns to collect delinquent gas bills. The combined call account records are analyzed to identify delinquent gas and electric bills related to the same individual and to tag each of the related delinquent call record accounts with a unique individual relation tag. The lock process 190 locks both records to prevent dialing until results are returned 198.

Once the call record accounts in the call record database are analyzed and, where appropriate, tagged, the call records are transferred to pools and queues as previously described to have outbound call attempts performed by dialer contact devices 108. In an alternative embodiment, call record accounts in the call record database are analyzed in real-time and tagged just before call records are selected for dialing in the dialing device. When a contact attempt is successful, a common account tag detector 162 associated with the dialer 108, searches to determine if the call record field is populated with a relationship tag. If the call record field is not populated with an individual relation tag, the dialer 108 handles the contact and communicates with distribution module 102 or 152 as described. If the call record field is populated, the dialer 108 communicates the unique individual relation tag to a common account controller 164 of distribution module 102 or 152. Common account controller 164 initiates a search for the unique relationship tag in the pools of distribution module 102 and 152 to place the call attempt result and a hold on outbound attempts for call record accounts related to the specified account. For example, successful contact by an operator for collection of the delinquent gas bill and delinquent electric bill of an individual may result in payments for each from one call.

Figure 3:
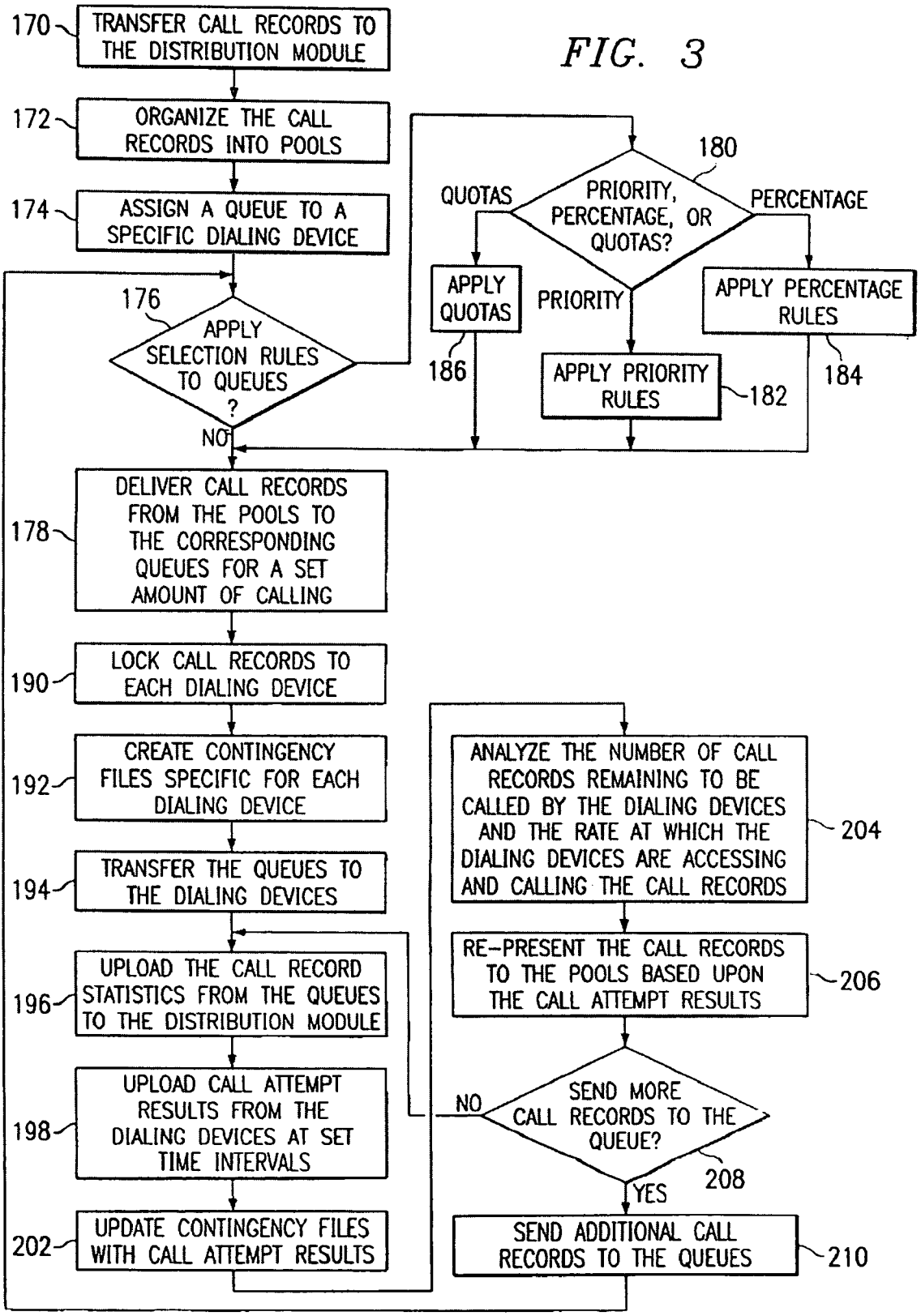
FIG. 3 depicts a flow diagram of a method for distribution outbound telephone calls.

Referring now to FIG. 3, a flow diagram depicts a process for distributing outbound call records. The process begins at step 170 with the transfer of call records from host 112, dialing devices 108, or scheduling module 122 to distribution module 102. In step 172, distribution module 102 organizes and arranges the call records into pools 128. Based upon user inputs distribution module 102 assigns queues 130 to specific dialing devices in step 174.

In step 176, distribution module 102 checks to see if the selection rules are to be applied to pools 128 and queues 130. If the selection rules are not to be applied, then the process continues in step 178. If selection rules are to be applied, then in step 180 distribution module 102 determines if priority, percentage, or quota rules are applied to pools 128. If priority rules are applied, then in step 182 distribution module 102 applies the priority rules to pools 128 and queues 130 and the process continues on to step 178. If percentage rules are applied, then in step 184 distribution module 102 applies the percentage rules to pools 128 and queues 130 and the process continues in step 178. If the quota rules are applied, then in step 186 distribution module 102 applies the quotas to pools 128 and queues 130 and the process continues to step 178.

Distribution module 102 then delivers enough call records to queues 130 for dialing devices 108 to place telephone calls for fifteen, thirty, sixty minutes, or an appropriate amount of time to place calls in step 178. In step 190, distribution module 102 locks the call records assigned to dialing devices 108 and creates a contingency file specific for each dialing device 108 in step 192.

In step 194, distribution module 102 transfers queues 130 containing the set number of call records to dialing devices 108. Periodically, distribution module 102 uploads call record statistics from each queue 130 in step 196. Distribution module 102 may upload the call record statistics from queues 130 every few seconds, every few minutes, every hour, or any other appropriate interval of time. Call record statistics include such information as how many call records remain to be called and the rate at which dialing devices 108 are depleting the call records in queues 130. In addition to uploading call record statistics, in step 198 distribution module 102 also uploads call attempt results. Call attempt results include whether a right party contact or wrong party contact was made or whether an answering machine was reached when dialing devices 108 place a telephone call.

In step 202 distribution module 102 updates the contingency file with the call attempt results specific for dialing devices 108. In step 204, distribution module 102 uses the call record statistics gathered in step 196 to analyze the number of call records remaining to be called and the depletion rate of the call records within queues 130. Based upon the call attempt results, distribution module 102 re-presents to pools 128 call records where the first attempt to make a right party contact was unsuccessful so that the call record can be called later in the day in step 206. In addition, the call record can be made unavailable for the remainder of the day if a right party contact was made.

Based upon the call record statistics, distribution module 102 determines in step 208 if more call records need to be sent from pools 128 to queues 130. If more call records are needed, then in step 210 distribution module 102 sends additional call records from pools 128 to queues 130 and the process repeats beginning with step 176 until manually stopped. But if distribution module 102 determines that no additional call records need to be sent from pools 128 to queues 130 in step 208, then the process repeats beginning with step 196 until manually stopped or until there are no call records remaining to be called.

Figure 4A:
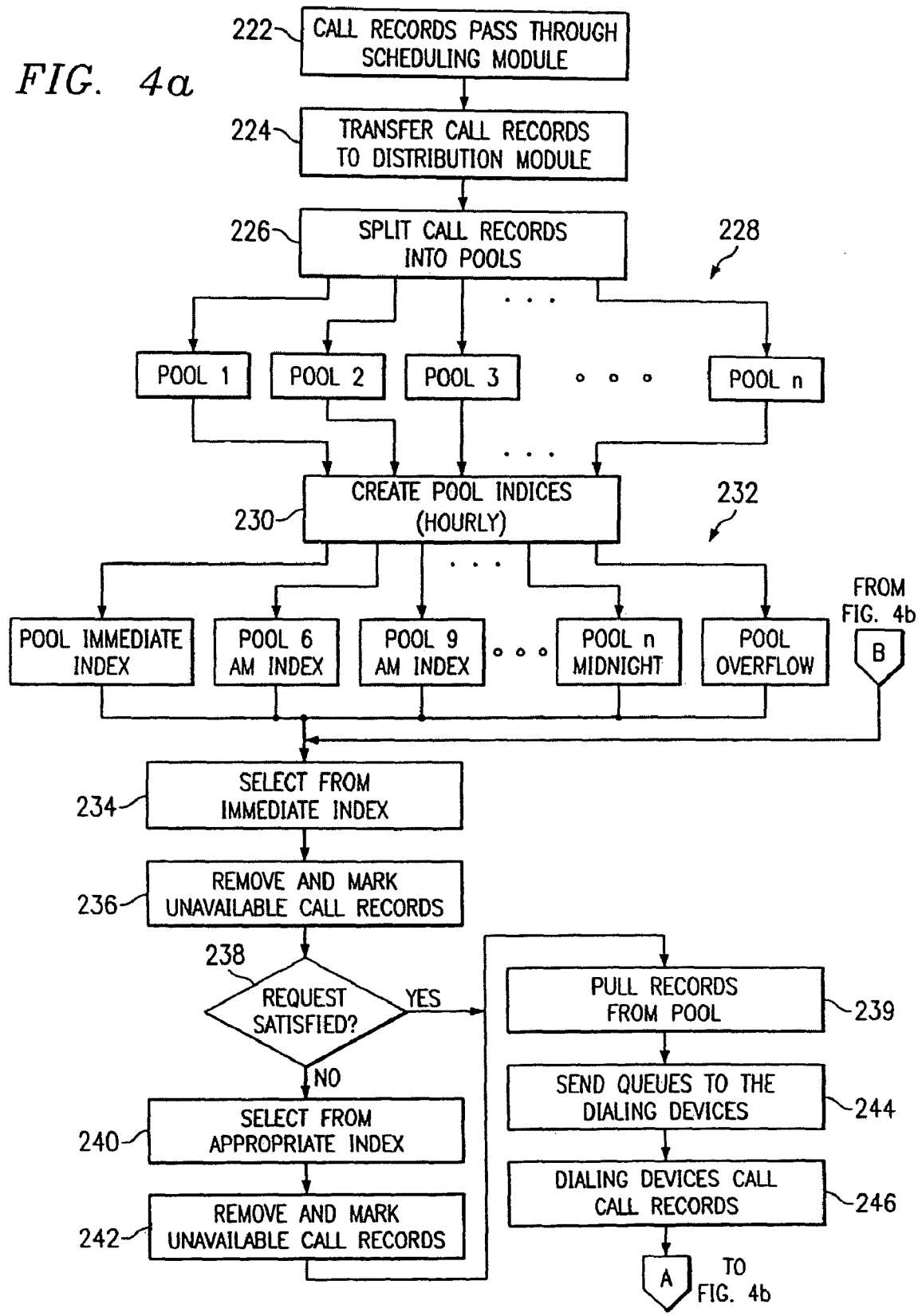

FIGS. 4a and 4b illustrate a flow diagram for the population of pools 128 and queues 130 with call records. The call records in FIGS. 4a and 4b include scheduling information provided by scheduling module 122.

Referring to FIG. 4a, in step 222 the call records pass through scheduling module 122 from either dialing devices 108 or host 112. Scheduling module 122 adds call scheduling information to each call record as it passes through it. In step 224, scheduling module 122 transfers the call records containing call scheduling information to call record database 118 within distribution module 102. Distribution module 102 then arranges the call records into pools 128 in step 226. When distribution module 102 places the call records into pools 128, distribution module 102 examines each call record to determine how to extract the scheduling information, account number and telephone number from the call record. In addition, distribution module 102 flags any call records where the scheduling information or telephone number is stripped from the end of the call record before placing it in the pools 128.

In step 228, distribution module 102 splits the call records into a plurality of pools 128. Each pool 128 holds the call record as a data string and the call records are in the same format within pools 128. In addition, distribution module 102 arranges the call records within pools 128 so that each call record is selectable by its account number.

The call scheduling information provided by scheduling module 122 allows for an optimum order to call the call records. Using the call scheduling information, distribution module 102 creates hourly indices for pools 128 in step 230. The hourly indices allow for pools 128 to take advantage of the fact that the call order and call priority of each call record changes based upon the time of day. For example, a call record might be scheduled to be the first call at 8:00 AM and if not successfully called at 8:00 AM then rescheduled to be the tenth call made at 6:00 PM. There is a hourly index created for each hour of the calling day and the hourly indices are shown in step 232. Distribution module 102 creates an index for each hour for each pool 128.

In addition to the hourly indices, distribution module 102 also creates an immediate index and an overflow index. The immediate index contains call records that are always the first to be called at the beginning of every hourly index. The call records within the immediate index allow real time call record insertion based upon previous call attempts and are often call records that resulted in no contact when called the first time. Call records contained in the overflow index are call records which were not scheduled to be called or call records that do not have call scheduling information.

Once the call records are arranged into pools 128 and the hourly indices are created, the process of transferring the call records from pools 128 to queues 130 begins. In step 234, distribution module 102 selects the call records contained in the immediate index. Distribution module 102 also removes any call records that are unavailable to be called and marks the call records as unavailable in step 236. In step 238, distribution module 102 determines if it is ready to transfer the call records from pools 128 to queues 130 for this hour and if there are a sufficient number of call records to be transferred from the immediate index to allow for fifteen, thirty, sixty minutes, or an appropriate amount of time for calling. If there are sufficient call records, then in step 239, distribution module 102 transfers the call records from the pool immediate index to queues 130.

If there are not enough call records in the immediate index, then in step 240 distribution module 102 selects call records from the appropriate hourly index. These additional call records in combination with call records from the immediate index will allow for fifteen, thirty, sixty minutes, or an appropriate amount of time for calling. In step 242, distribution module 102 removes any call records unavailable to be called and marks the call records as unavailable. Distribution module 102 then transfers the call records from the immediate index and the appropriate hourly index to queues 130 in step 239.

In step 244, distribution module 102 transfers queues 130 containing the call records to dialing devices 108. After queues 130 are transferred to dialing devices 108, in step 246 dialing devices 108 begin calling the call records.

Referring to FIG. 4b, as dialing devices 108 call the call records, distribution module 102 monitors dialing devices 108 and queues 130 for when it is time to send the next hourly index of call records from pools 128 to queues 130 in step 248. In determining when to send the next hourly index, distribution module 102 cannot start morning hour queues before the actual hour of the hourly index and must stop evening hour queues before the hourly index hour expires. For instance, the pool morning hourly index for 10:00 AM cannot be sent from pools 128 to queues 130 before 10:00 AM and the evening hourly index for 7:00 PM must stop calling at 8:00 PM. This is in part to due to telemarketing regulations that regulate the times of day that telemarketing calls may be placed.

If in step 248 it is time for the next hourly index, then in step 250 distribution module 102 selects the next hourly index to be called and begins the process of transferring the call records from the appropriate hourly index to queues 130. The process of selecting the next hourly index repeats steps 234 through 244 by first taking call records from the immediate index and adding call records from the appropriate hourly index as explained above.

If in step 248 it is not time for the next hour, then distribution module 102 determines queue depth and the time to go in step 252. Queue depth is the amount of call records remaining to be called in the queue while time to go is the amount of time remaining in the hour for the hourly index. In step 254 if the depth is not too low and the time to go is not too short so that there are a sufficient amount of call records to call for the remaining time left in the hour, then additional call records are not needed in queue 130. So in step 256, the call attempt results regarding a right or wrong party contact are uploaded from dialing devices 108 and sent back to distribution module 102 in step 258. The process then returns to step 234 of FIG. 4a to begin the next record search.

If in step 254 distribution module 102 determines that the depth is too low or the time to go is too short, then in step 260 distribution module 102 calculates the number of call records needed to finish out the hour for the hourly index. In step 262, distribution module 102 selects additional call records to call by repeating steps 234 through 239 above and transferring the call records from the pools 128 to queues 130 in step 264 so that dialing devices 108 do not sit idle but finish out the hour placing telephone calls. The process then returns to step 234 of FIG. 4a to begin the next record search.

Figure 5:
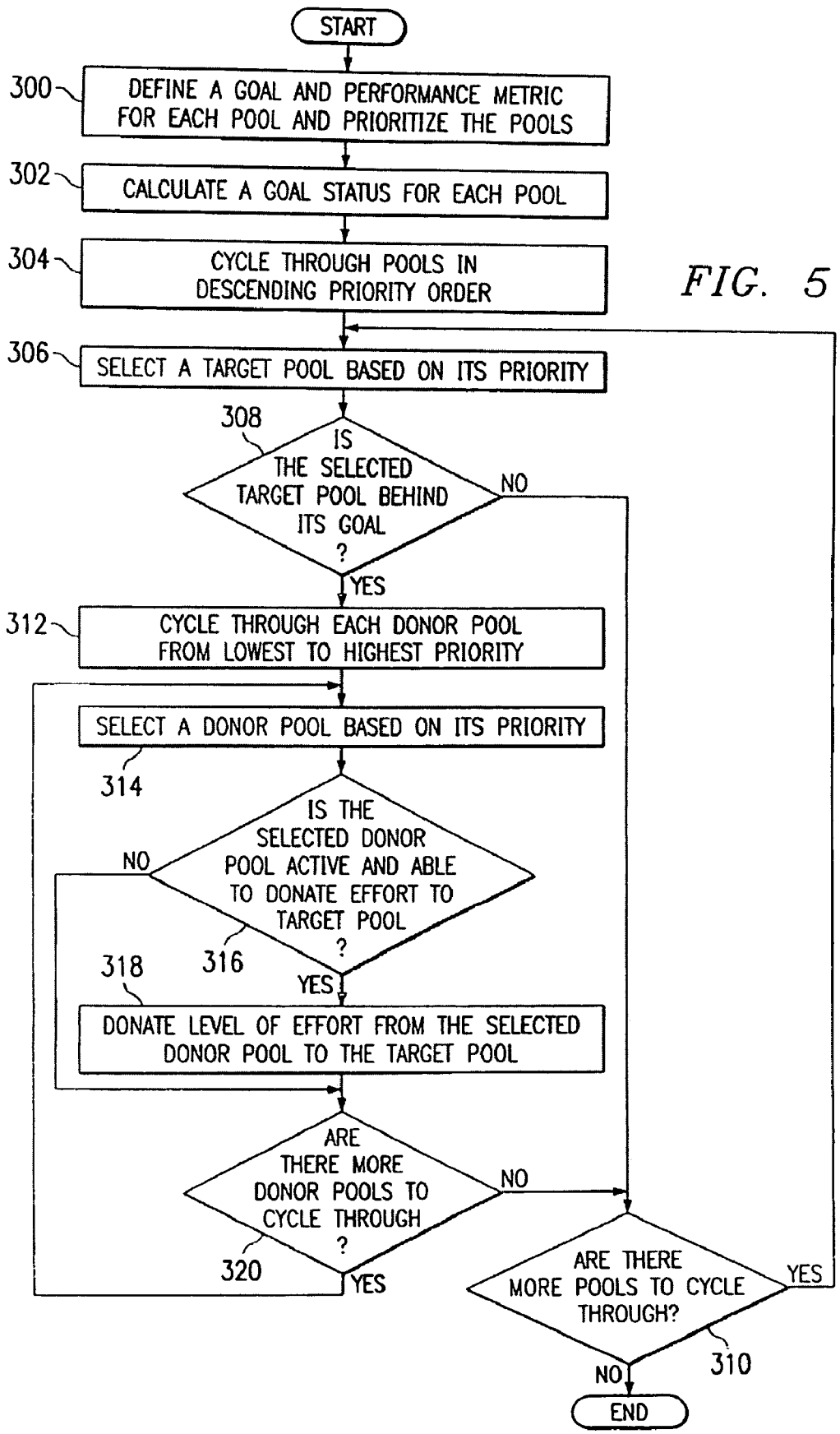
FIG. 5 depicts a flow diagram of a method for goals based routing of contact records employing a meet-goals goal strategy.

FIG. 5 depicts a flow diagram of a method for goals based routing of contact records employing a meet-goals goal strategy. The method begins at step 300 when goal module 103 selects a performance metric for each pool 128, determines a goal for each pool 128 and prioritizes pools 128 relative to each other. At step 302 goals module 103 calculates a goal status for each pool 128 using the goal and performance metric for each pool 128. After goal module 103 has calculated a goal status, goal module 103 cycles through pools 128 in descending priority order at step 304.

At step 306, goal module 103 selects a target pool based on its priority. Goal module 103 selects a target pool by first selecting the pool 128 having the highest priority. Goal module 103 then determines the goal state from the goal status for the target pool to determine if the target pool is behind goal at step 308. If the target pool is not behind goal, then at step 310 goal module 103 checks to see if there are additional pools 128 to cycle through. If there are not additional pools 128 to cycle through, then the process ends. But if there are additional pools 128 to cycle through at step 310, then the process returns to step 306 where goal module 103 selects the pool 128 having the next highest priority to determine if that target pool is behind goal. If that target pool is not behind goal, then the process repeats until either goal module 103 locates a target pool that is behind goal at step 308 or the process ends because no target pools are behind goal.

If at step 308, the target pool is behind goal, then goal module 103 cycles through donor pools from lowest to highest priority at step 312. The donor pools include all the other pools 128 except the target pool that was selected at step 308. At step 314, goal module 103 selects a donor pool 128 having the lowest priority out of all the donor pools. The goal module 103 then determines if the selected donor pool is active and able to donate levels of effort to the target pool at step 316. A pool 128 is active when it is still transferring contact records to queues 130 and hasn't satisfied its final goal or quota. Goal module 103 examines the routing table for the selected donor pool to determine if the donor pool is able to donate levels of effort to the target pool. Since each pool 128 has its own routing table, goal module 103 must examine the routing table to determine if the donor pool is able to donate any levels of effort. Generally, if the selected donor pool is ahead of goal or at goal, it is able to donate a percentage of level of effort to the target pool regardless of the respective pool priorities. If the donor pool is behind goal but the target pool is of a higher priority, then generally the donor pool is available to donate some percentage of level of effort. If the donor pool is behind goal and the target pool is of the same priority or lower priority, then typically the donor pool is not able to donate any level of effort to the target pool.

If at step 316 the donor pool is both active and able to donate a percentage of level of effort to the target pool, then at step 318 goal module 103 transfers a percentage of the level of effort from the donor pool to the target pool. Goal module 103 transfers the level of effort from the donor pool to the target pool by modifying the effort map in accordance with the limits specified in the routing table for the donor pool. To donate the level of effort from the donor pool to the target pool, goal module 103 examines the routing table for the donor pool to determine how much level of effort may be donated from the donor pool to the target pool. For instance using the example routing table in Table 3, if the target pool is of a higher priority than the donor pool and the donor pool is above its goal, then goal module 103 transfers 75% of the level of effort for the donor pool to the target pool. Therefore, if pool 128a is the donor pool and pool 128c is the target pool, goal module 103 transfers 75% of the level of effort for pool 128a to pool 128c thereby allowing queue 130a to receive 25% of its contact records from pool 128a and 75% of its contact records from pool 128c instead of queue 130a receiving 100% of its contact records from pool 128a. Pool 128c now supplies contact records to queues 130a and 130d instead of just queue 130d which allows additional agents 110 to access contact records from pool 128c and thereby meet the goal for pool 128c. Goal module 103 then modifies the effort map to reflect this change in the levels of effort between pools 128.

After goal module 103 transfers the level of effort, at step 320 goal module 103 determines if there are additional donor pools to cycle through. If there are additional donor pools to cycle through, then the process returns to step 314 where goal module 103 selects the donor pool having the second lowest priority and the process repeats until there are no more donor pools to cycle through at step 320. If at step 316 the donor pool is either not active or not able to donate a percentage of level of effort to the target pool, the process proceeds to step 320 where goal module 103 determines if there are additional donor pools to cycle through as described above.

When at step 320 goal module 103 determines that there are no more donor pools to cycle through, the process proceeds to step 310 where goal module 103 determines if there are any additional pools 128 to cycle through. If there are no more pools 128, then the process ends. If there are additional pools, then the process returns to step 306 where goal module 103 selects the next pool 128 based on its priority to determine if it is behind its goal.

The method of FIG. 5 repeats until goal module 103 has checked every pool 128 from highest to lowest priority to see if pools 128 are behind goal. Therefore, the pools 128 having the highest priority are addressed first by goal module 103 ensuring that pools 128 having the highest priority shall achieve and/or maintain their goals by transferring levels of effort away from pools 128 having a lower priority to pools 128 having a higher priority.

Figure 6:
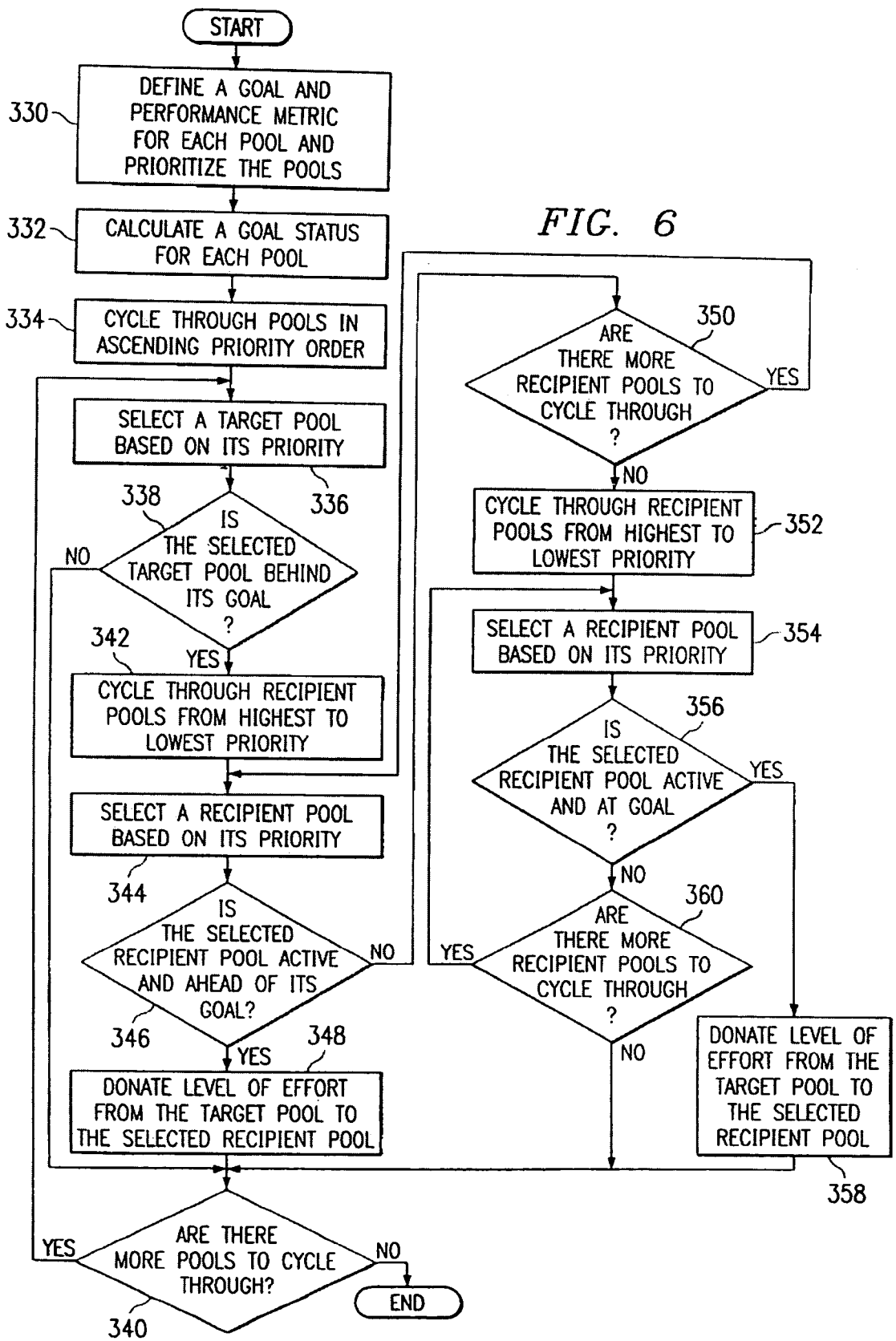
FIG. 6 illustrates a flow diagram of a method for goals based routing of contact records employing an exceed-goals goal strategy.

FIG. 6 illustrates a flow diagram of a method for goals based routing of contact records employing an exceed-goals goal strategy. The method begins at step 330 when goal module 103 selects a performance metric for each pool 128, determines a goal for each pool 128 and prioritizes pools 128 relative to each other. At step 332, goal module 103 calculates a goal status for each pool 128 using the goal and performance metric for each pool 128. After goal module 103 has calculated a goal status, goal module 103 cycles through pools 128 in an ascending priority order at step 334.

At step 336, goal module 103 selects a target pool based on its priority. Goal module 103 selects a target pool by first selecting the pool 128 having the lowest priority. Goal module 103 then determines the goal state using the goal status for target pool to determine if target pool is behind goal at step 338. If target pool is not behind goal, then at step 340 goal module 103 checks to see if there are additional pools 128 to cycle through. If there are no additional pools 128 to cycle through, the process ends. But if there are additional pools 128 to cycle through at step 340, then the process returns to step 336 where goal module 103 selects the pool 128 having the next lowest priority to determine if that target pool is behind goal. If that target pool is not behind goal, then the process repeats until either goal module 103 locates a target pool that is behind goal at step 338 or the process ends because no target pools are behind goal.

If at step 338, the target pool is behind goal, then goal module 103 cycles recipient pools from highest to lowest priority at step 342. The recipient pools include all the other pools 128 except the target pool that was selected at step 336. At step 344, goal module 103 selects a recipient pool having the highest priority out of all the recipient pools. Goal module 103 then determines if the selected recipient pool is active and ahead of its goal at step 346. A pool 128 is active when it is still transferring contact records to queues 130 and has not satisfied its final goal or quota.

If at step 346 the recipient pool is both active and ahead of its goal, then at step 348 goal module 103 transfers a percentage of the level of effort from the target pool to the recipient pool. After goal module 103 transfers the level of effort, at step 340 goal module 103 determines if there are additional pools 128 to cycle through. If there are no additional pools 128 to cycle through at step 340, then the process ends. But if at step 340 there are additional pools 128 to cycle through, then the process returns to step 336 where goal module 103 selects the target pool having the next lowest priority.

If at step 346 the recipient pool is either not active or not ahead of goal, the process proceeds to step 350 where goal module 103 determines if there are additional recipient pools to cycle through. If there are additional recipient pools to cycle through at step 350, then the process returns to step 344 where goal module 103 selects a recipient pool having the next highest priority and the process repeats as described above.

If at step 350 there are no more recipient pools to cycle through, the process continues to step 352. The method only proceeds to step 352 after goal module 103 has examined all of the recipient pools to determine if the recipient pools are active and ahead of goal. At step 352, goal module 103 cycles through recipient pools from highest to lowest priority and at step 354 goal module 103 selects the recipient pool having the highest priority. At step 356, goal module 103 determines if the selected recipient pool is active and at goal. If the selected recipient pool is active and at goal, then at step 358 goal module 103 transfers a percentage of the level of effort from the target pool to the selected recipient pool. The process then continues on to step 340 where goal module 103 determines if there are additional pools 128 to cycle through and the process either ends or returns to step 336.

If at step 356 goal module 103 determines that the selected recipient pool is either not active or not at goal, then at step 360 goal module 103 determines if there are additional recipient pools to cycle through. If there are not additional recipient pools to cycle through, then the process continues to step 340 where goal module 103 determines if there are additional pools 128 to cycle through as described above. If there are additional recipient pools to cycle through at step 360, then the process returns to step 354 where goal module 103 selects the next recipient pool having the next highest priority and the process repeats as described above.

The method of FIG. 6 repeats until goal module 103 has checked every pool 128 from lowest to highest priority to see if pools 128 are behind goal. Therefore, the pools 128 having the lowest priority are examined first to determine if they are able to donate a percentage of level of effort to pools 128 having higher priority so that the pools 128 having the highest priority exceed their goals.

In an alternate embodiment, the present invention applies to the different types of contacts records and devices listed above and manages other types of customer contact requests such as inbound calls, email, Internet chat, online requests for live chat in addition to outbound call records.

Figure 7:
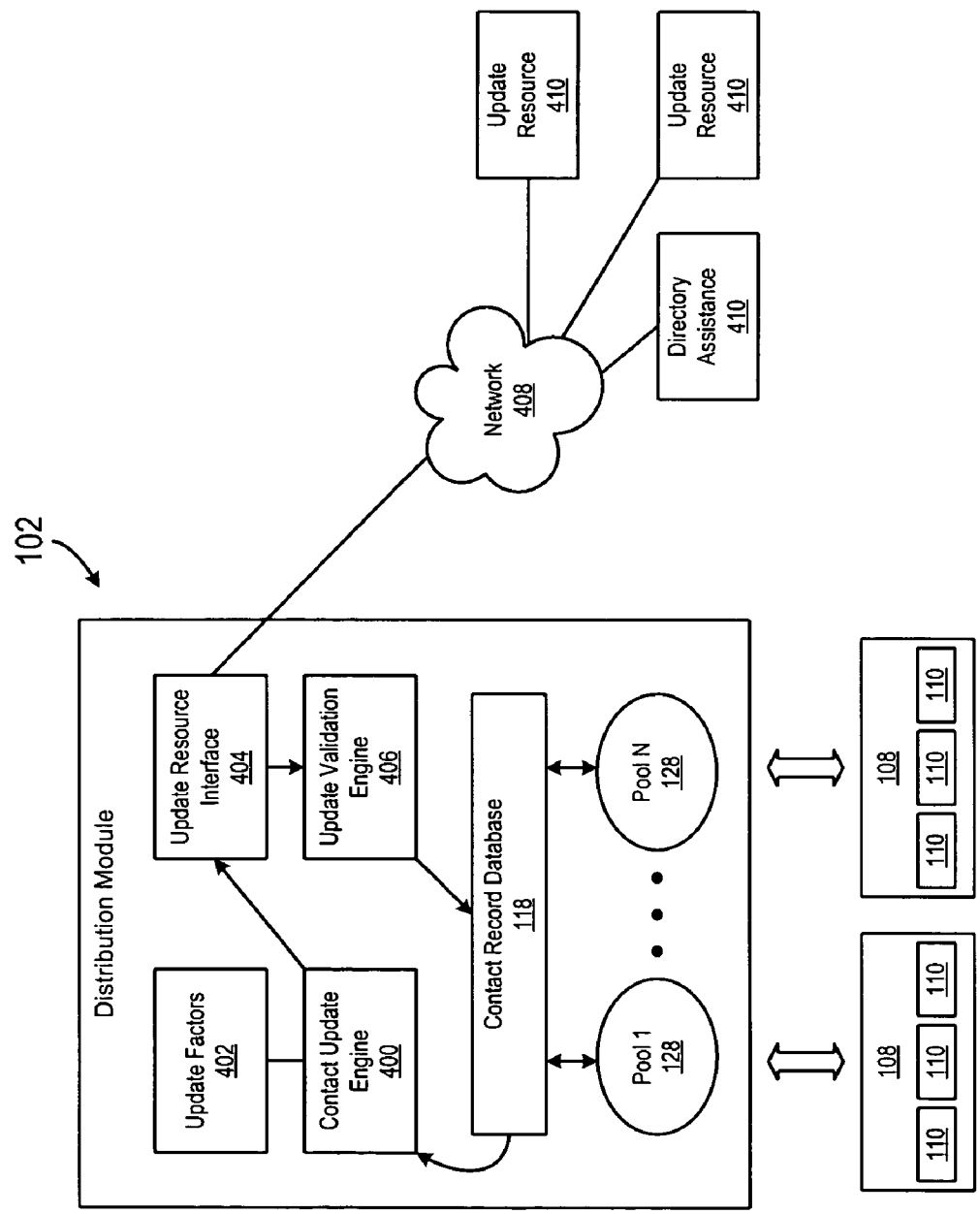
FIG. 7 depicts a block diagram of a distribution module adapted to automatically perform real time contact information updates.

Referring now to FIG. 7, a block diagram depicts a distribution module 102 adapted to perform real time contact information updates. Plural contact devices 108 dial outbound telephone numbers provided from pools 128 and contact record database 118 as previously described. The results of contact attempts are returned from contact devices 108 to distribution module 102 for storage in contact record database 118. For instance, in a collections call campaign, call attempts to a telephone number associated with a contact record may include a successful contact, whether or not the contacted individual agreed to pay, or an unsuccessful contact, such as a busy tone, an answering machine, a no answer, an inoperative number or a wrong number. A contact update engine 400 analyzes contact record database 118 to identify contact records having an unsuccessful contact attempt. Contact update engine 400 selects from the identified contact records according to update factors 402 those contact records to update and communicates the selected contact records to update resource interface 404. Update resource interface 404 communicates through a network 408 with update resources to obtain updated contact information and provides the update to update validation engine 406 for validation of the update before transfer for use through contact record database 118.

Contact update engine. 400 applies user selectable update factors 402 to identify and select contact records for updating. In one embodiment, contact update engine 400 is a rules-based engine that identifies contact records as "no contacts" based on a first set of rules and selects identified contacts for updating based on a second set of rules. For instance, contact records having a contact result code of an inoperative telephone number is determined a no contact, and a contact record having greater than a predetermined account balance delinquency is selected for updating. Other examples of update factors to identify contact records as no contacts include an answered call that indicates a wrong number, a predetermined number of unanswered calls, or previous skip trace history associated with the contact record. Other examples of update factors to select contact records for updating include the length of delinquency, the number of delinquent accounts for an individual, and the source of previous skip traces.

In one embodiment, contact update engine 400 is a model that predicts the outcome of call attempts with skip traced contact information, such as a probability of a cure reached on a delinquent account from updated contact information. For instance, a logistic regression model with two or more outcomes, such as cure, contact and no cure, provides an estimate for the value of an update for a contact record when compared with the cost of obtaining an update. If the probable recovery for a contact record is less than the cost of obtaining the update, then selection of the contact record for an update becomes uneconomical. The predictive variables to model the expected result of a contact record update include account information, credit report information, call history, payment history and other relationship information.

Update resource interface 404 communicates with update resources, such as directory assistance, with XML formatted information sent via secure HTTP messages. Information sent to the update resources includes the individual associated with the contact record, the available contact address and phone information, and other relevant information, such as drivers license and social security numbers, as well as an optional skip-trace data source and query scenario. Update resource interface 404 selectively communicates to desired update resources so that update cost and source information is tracked. In this manner, for instance, high value accounts may be sequentially updated from different update resources. Update resource interface 404 receives contact record updates with new contact information, such as new telephone numbers, and a confidence score that indicates the confidence of the new contact information, and provides the updated information to update validation engine 406. Update validation engine 406 validates the updated contact information by comparing it with existing information to confirm a lack of duplicate contact information compared with existing contact information. Validated updates are then forwarded to contact record database 118 for inclusion as contact records inserted in pools 128. These updates may be applied to external databases as well.

Figure 8:
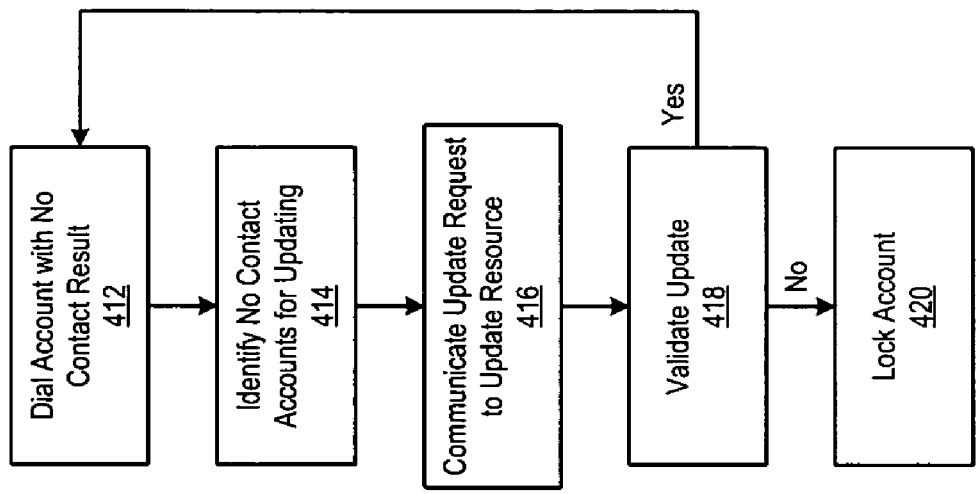
FIG. 8 depicts a flow diagram of a process for automated, real time contact information updates.

Referring now to FIG. 8, a flow diagram depicts a process for real time updates to contact records of a contact campaign. The process begins at step 412 with the dialing of an account to a no contact result, such as a message that the number dialed is inoperative. The process continues to step 414 for the identification of no contact accounts for updating by application of the update factors to the contact record and contact attempt history. At step 416, a contact information update request is communicated to an update resource to obtain updated contact information. At step 418, if the update request provides valid contact information, then the process returns to step 412 to perform contact attempts with the contact information. At step 418, if the update request provides contact information that is not valid, such as contact information that is duplicative of existing contact information, the process continues to step 420 for a locking of the account to preclude additional contact attempts.

Updates to contact information are customizable and may automatically cumulate previous update information to perform subsequent updates by incorporating updated information into subsequent update requests. For instance, business rules customize the decision of whether and how to perform an update. One example of such customization is the user selection of a minimum confidence score that must be associated with an update before using the update. The confidence score is calculated along with the skip trace to predict the accuracy of the update. Another example of customization is the performance of update requests based on the results of previous updates. For instance, if a call attempt's result code indicates a bad phone number, then custom logic requests a skip trace query using the consumer file and a high confidence threshold. The system denotes that the contact record has had one skip trace attempt. If data is returned, another contact attempt is performed using the updated information. If that attempt returns a bad phone number code as well, custom logic requests another skip trace attempt using the consumer file, but using a metroplex match and allowing a lower confidence threshold to accept a less specific match. The system denotes the contact record's number of skip trace attempts increases to two. If data is returned, another contact attempt is performed using the updated information. If that attempt returns a bad phone number code, custom logic requests a final query, this time attempting a lookup against directory assistance and accepting a lower confidence score. Again, the system denotes that the contact record has now had three skip attempts. Lock the account if no info is returned, or if subsequent calls return bad phone number indicators. Real-time updates made with user-definable rules improves the success rate through multiple skip trace attempts on a single account within a desired time frame, such as the hour of a campaign identified as the optimal time to contact an individual.

Although the present invention has been described in detail, it should be understood that various changes, substitution, and alterations can be made hereto without parting from the spirit and scope of the invention as defined by the appended claims.

What is claimed is:

1. A system for coordinating the real time updating of contact records associated with one or more contact devices, the contact devices performing a campaign of outbound contact attempts with the contact records, the system comprising: a contact record database operable to communicate contact records with the one or more contact devices during the campaign, each contact record associating one or more contact individuals, one or more contact numbers and one or more contact results; a contact update engine interfaced with the contact record database and operable to identify one or more contact records for update of the associated contact numbers based on one or more update factors; an update resource interface operable to obtain up dated contact numbers for the identified contact records from one or more selected update resources; and an update validation engine operable to validate updated contact records and communicate the validated contact records to the contact record database for appropriate action by the contact devices during the campaign.

2. The system of claim 1 wherein the account update engine comprises a rules-based engine and the update factors comprise one or more rules, the rules-based engine operable to identify one or more contact records for updating if the contact results associated with a contact record meet one or more of the rules.

3. The system of claim 2 wherein a rule comprises a contact result of an inoperable number.

4. The system of claim 2 wherein the contact results comprise the number of previous updates associated with a contact record and a rule comprises updating only accounts with less than a predetermined number of previous updates.

5. The system of claim 1 wherein the update resource interface is further operable to select one of plural update resources based on the contact results and one or more update factors.

6. The system of claim 1 wherein the account update engine comprises a predictive model and the update factors comprise one or more predictive parameters, the model operable to identify a contact record for updating if application of the contact results associated with the contact record predict a predetermined result.

7. The system of claim 6 wherein the model comprises a logistic regression model of the probability to cure with an updated contact record.

8. A method for coordinating the real time updating of contact records, the method comprising: performing contact attempts with one or more contact devices using plural contact records, each contact record having contact information; identifying contact records having contact attempts with a result of no contact; selecting based on one or more update factors one or more of the identified contact records for updating of associated contact information; obtaining updated contact information for the selected contact records from selected update resource; and re-attempting contact by a contact device with the updated contact information.

9. The method of claim 8 wherein selecting based on one or more update factors further comprises selecting contact records having contact information that meets one or more rules.

10. The method of claim 9 wherein a rule comprises a delinquent balance of greater than a predetermined amount.

11. The method of claim 9 wherein a rule comprises less than a predetermined number of previous contact information updates.

12. The method of claim 8 wherein selecting based on one or more update factors further comprises:
applying the contact information to a model to predict a result of an update; and
selecting contact records having a predetermined predicted result.

13. The method of claim 12 wherein the predetermined predicted result comprises likelihood of cure from updated contact information resulting in value greater than the cost of the contact information update.

14. The method of claim 12 wherein the model comprises a logistic regression model predictive of cost of contact.

15. A system for contacting individuals, the system comprising: plural dialers, each dialer operable to dial outbound telephone calls to individuals, each individual having one or more associated contact records with one or more numbers for a dialer to dial; a contact record database interfaced with the dialers and operable to provide the dialers with contact records to dial, the contact record database further operable to receive results of contact attempts by the dialers to the numbers of the contact records; a contact update engine interfaced with the contact record database and operable to select contact records to update associated contact numbers based on update factors; and an update resource interface operable to obtain the real time updating for the selected contact records from selected one or more update resources, the update resource interface communicating the updates to the contact record database for use by the dialers.

16. The system of claim 15 wherein the contact update engine comprises a rules-based engine having a rule of obtaining an update for contact results of wrong number.

17. The system of claim 15 wherein the contact update engine comprises a model of the likelihood of success from a contact attempt with an updated contact number.

18. The system of claim 15 wherein the contact record database provides updates to dialers on a real time basis.

19. The system of claim 15 wherein the update resource interface is further operable to select one of plural update resources to update a contact record based at least in part on update cost.

20. The system of claim 15 wherein an update comprises a confidence rating of the relative accuracy of the update.

21. The system of claim 15 wherein the contact update engine is further operable to perform plural updates of selected contact records.

22. The system of claim 21 wherein the contact update engine is further operable to cumulate updated contact information for use as update factors.

23. The system of claim 21 wherein the contact update engine is further operable to incorporate updated information in a subsequent update request.

* * * * *